US012487541B2

(12) United States Patent
Fukumoto

(10) Patent No.: US 12,487,541 B2
(45) Date of Patent: Dec. 2, 2025

(54) IMAGE FORMING DEVICE AND TONER REPLENISHMENT CONTROL METHOD IN IMAGE FORMING DEVICE

(71) Applicant: SHARP KABUSHIKI KAISHA, Sakai (JP)

(72) Inventor: Shohei Fukumoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1 day.

(21) Appl. No.: 18/538,212

(22) Filed: Dec. 13, 2023

(65) Prior Publication Data

US 2024/0192623 A1 Jun. 13, 2024

(30) Foreign Application Priority Data

Dec. 13, 2022 (JP) ................................. 2022-198457

(51) Int. Cl.
*G03G 15/10* (2006.01)
*G03G 15/08* (2006.01)

(52) U.S. Cl.
CPC ..... *G03G 15/0849* (2013.01); *G03G 15/0875* (2013.01)

(58) Field of Classification Search
CPC ........... G03G 15/0849; G03G 15/0856; G03G 15/0875; G03G 15/556
See application file for complete search history.

(56) References Cited

U.S. PATENT DOCUMENTS

2009/0226194 A1* 9/2009 Mitamura .......... G03G 15/0853 399/30

FOREIGN PATENT DOCUMENTS

JP 2010-072305 A 4/2010

* cited by examiner

*Primary Examiner* — Hoang X Ngo
(74) *Attorney, Agent, or Firm* — ScienBiziP, P.C.

(57) ABSTRACT

According to an image forming device according to the disclosure, a required toner amount is calculated based on image data. A toner replenishment device replenishes a development device with toner of a first replenishment amount included in the required toner amount. Toner of the remaining second replenishment amount included in the required toner amount is replenished, based on a toner concentration detection value of a toner concentration sensor. When the image forming device stands continuously unused for a predetermined threshold time or longer, the toner of the second replenishment amount is not replenished during a time period from when an image forming process is started immediately after the unused time, until a specific time elapses.

17 Claims, 19 Drawing Sheets

| PRINTING RATE Rx (%) | REQUIRED TONER AMOUNT Qy (g) | REQUIRED TONER REPLENISHMENT TIME Ty (s) |
|---|---|---|
| 5 | 0.019 | 0.063 |
| 10 | 0.037 | 0.123 |
| 20 | 0.074 | 0.247 |
| 36 | 0.133 | 0.443 |
| 40 | 0.148 | 0.493 |
| 50 | 0.185 | 0.617 |
| ⋮ | ⋮ | ⋮ |
| 100 | 0.370 | 1.233 |

* REPLENISHMENT SPEED Vq = 18 g/min = 0.3 g/s

FIG. 5

200

| CUMULATIVE DEVELOPING DRIVE TIME Tx (min) | SECOND REPLENISHMENT AMOUNT CORRECTION COEFFICIENT β2 (%) | | |
|---|---|---|---|
| | LOW HUMIDITY | STANDARD | HIGH HUMIDITY |
| $Tx < 3$ | 30 | 20 | 0 |
| $Tx \geqq 3$ | 60 | 40 | 0 |

FIG. 12

300

| VARIATION AMOUNT ΔSd | FIRST REPLENISHMENT AMOUNT CORRECTION COEFFICIENT β1 (%) |
|---|---|
| ～ −11 | 70 |
| −10 ～ −8 | 80 |
| −7 ～ −5 | 90 |
| −4 ～ −1 | 95 |
| 0 ～ 3 | 100 |
| 4 ～ 6 | 105 |
| 7 ～ 9 | 110 |
| 10 ～ 14 | 120 |
| 15 ～ | 130 |

FIG. 14

400

| CONTINUOUS TIME Tz OF LOW PRINTING RATE (min) | FIRST REPLENISHMENT AMOUNT CALCULATION COEFFICIENT α1 (%) |
|---|---|
| 0 ~ | 95 |
| 3 ~ | 95 |
| 6 ~ | 95 |
| 10 ~ | 95 |
| 15 ~ | 96 |
| 20 ~ | 96 |
| 30 ~ | 97 |
| 60 ~ | 97 |

FIG. 17

400

| CONTINUOUS TIME Tz OF LOW PRINTING RATE (min) | FIRST REPLENISHMENT AMOUNT CALCULATION COEFFICIENT α1 (%) |
|---|---|
| 0 ~ | 80 |
| 3 ~ | 80 |
| 6 ~ | 80 |
| 10 ~ | 80 |
| 15 ~ | 85 |
| 20 ~ | 85 |
| 30 ~ | 90 |
| 60 ~ | 90 |

FIG. 19

IMAGE FORMING DEVICE AND TONER REPLENISHMENT CONTROL METHOD IN IMAGE FORMING DEVICE

TECHNICAL FIELD

The disclosure relates to an image forming device and a toner replenishment control method in the image forming device, and more particularly, relates to an image forming device and a toner replenishment control method in the image forming device that form an image based on image data on an image recording medium by an electrophotographic method.

BACKGROUND ART

There is known an image forming device in which a required toner supply amount is determined based on the number of image pixels of image data, and toner is supplied to a developer storage chamber of a developing device, based on the determined toner supply amount. In such an image forming device, a toner patch used for a toner concentration measurement is formed on an image carrier, the toner concentration of the toner patch formed on the image carrier is measured by a concentration detector, and a toner supply amount is corrected, based on the toner concentration measured by the concentration detector. The toner patch is formed to the image carrier at a predetermined timing.

SUMMARY OF INVENTION

Technical Problem

As described above, in the image forming device in which the toner replenishment amount is corrected based on the toner concentration of the toner patch measured by the concentration detector, the toner patch is formed on the image carrier at a determined timing. That is, the toner patch is not frequently formed, and therefore, the toner supply amount is also not frequently corrected. In short, the toner replenishment amount may not be appropriate.

In view of the above, it is an object of the disclosure to provide a novel image forming device and a toner replenishment control method in the image forming device, by which it is possible to always replenish an appropriate amount of toner.

Solution to Problem

In order to achieve this object, the disclosure includes a first disclosed aspect relating to an image forming device and a second disclosed aspect relating to a toner replenishment control method in an image forming device.

The first disclosed aspect relating to an image forming device includes a developing device, a toner concentration detector, a toner replenisher, a required toner amount calculator, a first replenishment controller, and a second replenishment controller. The developing device includes a storage in which developer including toner is stored. The developing device uses the toner to develop a latent image formed, based on image data, on an image carrier. The toner concentration detector detects a concentration of the toner included in the developer in the storage of the developing device. The toner replenisher includes a toner container in which the toner is stored, and replenishes the storage of the developing device with toner in the toner container. The required toner amount calculator calculates, based on the image data, more precisely, based on pixel data included in the image data, a required toner amount which is an amount of toner required for the development. The first replenishment controller controls the toner replenisher so as to replenish the storage of the developing device with toner of a first replenishment amount included in the required toner amount. The second replenishment controller controls the toner replenisher so as to replenish, based on a toner concentration detection value of the toner concentration detector, the storage of the developing device with toner of a second replenishment amount obtained by subtracting the first replenishment amount from the required toner amount. More precisely, after the first replenishment controller controls the toner replenisher to replenish the storage of the developing device with toner of the first replenishment amount, the second replenishment controller controls the toner replenisher so that the toner concentration detection value of the toner concentration detector is equivalent to a predetermined reference value. As a result, the storage of the developing device is replenished with toner of the second replenishment amount.

Note that the first replenishment amount is greater than the second replenishment amount.

The second replenishment controller may not replenish the storage of the developing device by the toner replenisher with the toner of the second replenishment amount, during a time period from when the development device starts the development until a predetermined specific time elapses, in a case where a standing time is equal to or longer than a predetermined threshold time, the standing time being a time during which the image forming device continuously stands unused.

In this case, a first corrector may be further provided. The first corrector corrects the first replenishment amount at the predetermined specific time, based on a variation amount of the toner concentration detection value.

Alternatively, a second corrector may be provided. The second corrector corrects, when the standing time mentioned above is equal to or longer than a predetermined threshold time, the second replenishment amount, based on some or all of a plurality of first parameters including a predetermined environmental factor and an elapsed time having a time point at which the development by the developing device starts as a starting point, during a time period from when the development by the developing device starts until a predetermined specific time elapses.

The predetermined specific time mentioned here may be set to a time in accordance with some or all of a plurality of second parameters including the standing time and a predetermined environmental factor.

Alternatively, a time point at which a variation amount of the toner concentration detection value is equal to or less than a predetermined variation threshold value may be set as an end point of the predetermined specific time.

Furthermore, a third corrector may be provided. When a low printing rate state continues in which the printing rate is relatively low, the third corrector corrects the first replenishment amount, based on a continuous time of the low printing rate state. Here, the low printing rate state refers to a state in which the printing rate is equal to or less than a predetermined printing rate threshold value, for example, a state in which the required toner amount is equal to or less than a predetermined replenishment amount threshold value.

In addition, the first replenishment amount may be set to a value in accordance with whether an automatic density adjustment function is provided. The automatic density adjustment function is a function of adjusting a driving parameter of a predetermined image forming element including the developing device, so that a toner consumption amount is constant with respect to the image data which is constant, and may be referred to as "process control".

The second disclosed aspect relating to a toner replenishment control method in an image forming device in the disclosure includes a required toner amount calculation step, a first replenishment control step, and a second replenishment control step. Here, the image forming device includes a developing device, a toner concentration detector, and a toner replenisher. The developing device includes a storage in which developer including toner is stored. The developing device uses the toner to develop a latent image formed, based on image data, on an image carrier. The toner concentration detector detects a concentration of the toner included in the developer in the storage of the developing device. The toner replenisher includes a toner container in which the toner is stored, and replenishes the storage of the developing device with toner in the toner container. Furthermore, in the required toner amount calculation step, a required toner amount, which is an amount of toner required for the development, is calculated based on the image data, more precisely, based on pixel data included in the image data. In the first replenishment control step, the toner replenisher is controlled so as to replenish the storage of the developing device with toner of a first replenishment amount included in the required toner amount. In the second replenishment control step, the toner replenisher is controlled so as to replenish, based on a toner concentration detection value of the toner concentration detector, the storage of the developing device with toner of a second replenishment amount obtained by subtracting the first replenishment amount from the required toner amount. More precisely, after the toner replenisher is controlled in the first replenishment control step to replenish the storage of the developing device with toner of the first replenishment amount, in the second replenishment control step, the toner replenisher is controlled so that the toner concentration detection value of the toner concentration detector is equivalent to a predetermined reference value. As a result, the storage of the developing device is replenished with toner of the second replenishment amount.

Advantageous Effects of Invention

According to the disclosure, it is possible to always replenish an appropriate amount of toner.

BRIEF DESCRIPTION OF DRAWINGS

FIG. 5 is a table showing a relationship between a printing rate, a required toner amount, and a required toner replenishment time in the first example.

FIG. 12 is a table conceptually showing a configuration of a second replenishment amount correction table in a fourth example of the disclosure.

FIG. 14 is a table conceptually showing a configuration of a first replenishment amount correction table in a fifth example of the disclosure.

FIG. 17 is a table conceptually showing a configuration of a continuous low printing rate time table in a sixth example of the disclosure.

FIG. 19 is a table conceptually showing a configuration of a continuous low printing rate time table in a seventh example of the disclosure.

DESCRIPTION OF EMBODIMENTS

First Example

Figure 1:
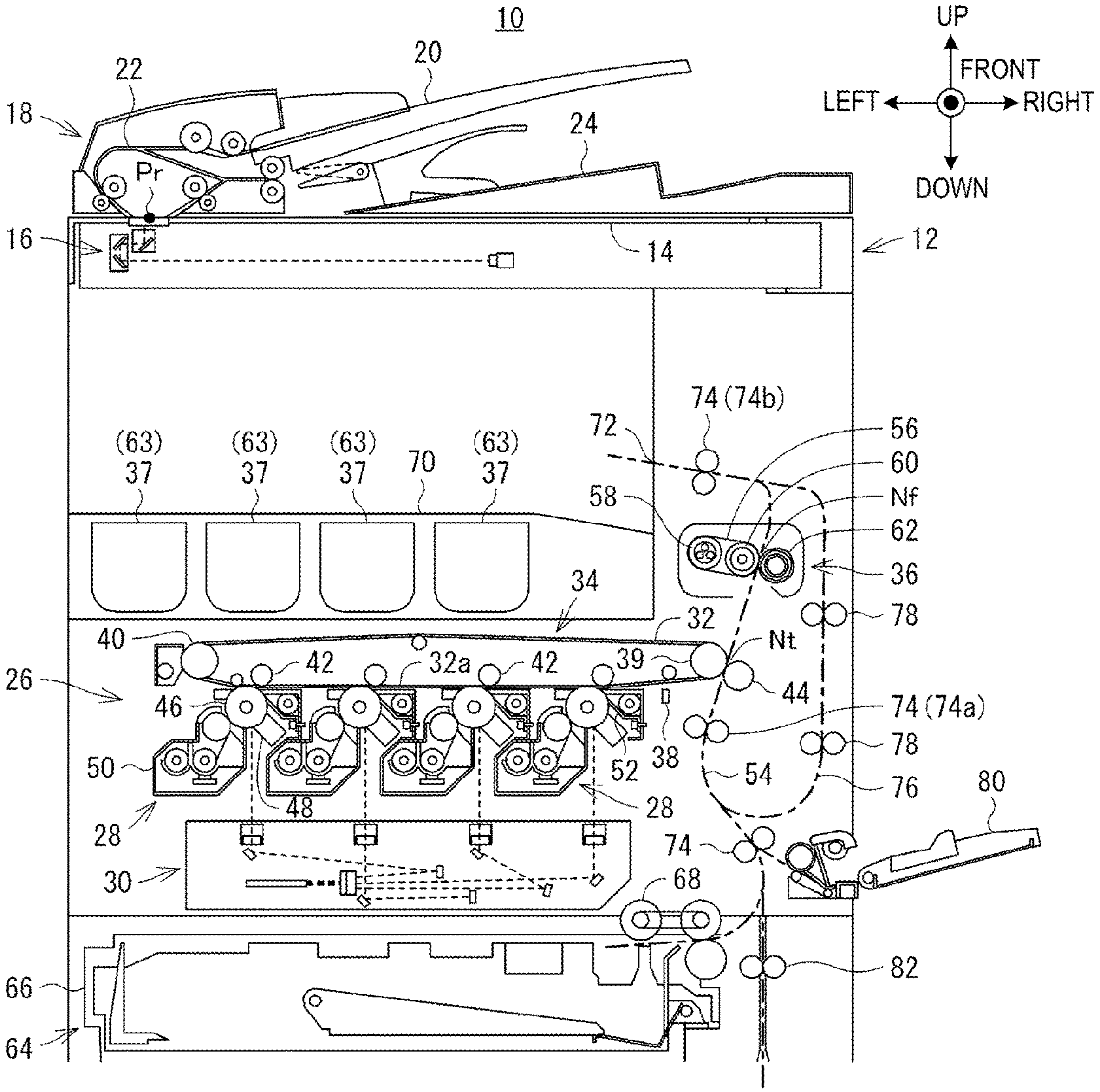
FIG. 1 is a diagram generally illustrating an internal configuration of an image forming device according to a first example of the disclosure.

A first example of the disclosure will be described by using an image forming device 10 illustrated in FIG. 1 as an example.

The image forming device 10 according to the present first example is a so-called multifunction peripheral (MFP) having a plurality of functions such as a copy function, a printing function, an image scanning function, and a facsimile function. FIG. 1 is a diagram of an internal configuration of the image forming device 10 installed in a usable state, when viewed from a front side of the image forming device 10. That is, an up-down direction in FIG. 1 corresponds to an up-down direction of the image forming device 10. A left-right direction in FIG. 1 corresponds to a left-right direction of the image forming device 10. Further, a front side of the sheet surface in FIG. 1 corresponds to the front of the image forming device 10. A back side of the sheet surface in FIG. 1 corresponds to the rear of the image forming device 10.

In an upper portion of the image forming device 10, an image scanner 12 is provided as an image scanner. The image scanner 12 performs an image reading process of reading an image of a document (not illustrated) and outputting the read two-dimensional image data corresponding to the image of the document. Therefore, the image scanner 12 includes a document table 14 on which a document is placed. The document table 14 is formed of a transparent member such as glass having a substantially rectangular flat plate shape, and is provided so that both main surfaces thereof are arranged along a horizontal direction. An image scanner unit 16 is provided below the document table 14. Although not described in detail, the image scanner unit 16 includes a light source, a mirror, a lens, a line sensor, and the like, and has a linear image reading position Pr extending along a front-rear direction of the image forming device 10 on the upper surface of the document table 14. Further, a driving mechanism (not illustrated) that causes the image reading position Pr of the image scanner unit 16 to move (scan) along the left-right direction of the image forming device 10 is provided below the document table 14. That is, when the image reading position Pr of the image scanner unit 16 is moved by the driving mechanism in a state where a document is placed on the document table 14, an image of the document is read by a so-called fixed reading method. The front-rear direction of the image forming device 10 is referred to as a main scanning direction. The left-right direction of the image forming device 10 is referred to as a sub-scanning direction.

Above the document table 14, an automatic document feeder (ADF) 18 is provided which also serves as a document pressing cover that presses a document placed on the document table 14. The automatic document feeder 18 is provided so as to transition between a state in which the upper surface of the document table 14 is exposed to the outside and a state in which the upper surface of the document table 14 is covered by the automatic document feeder 18. Therefore, the automatic document feeder 18 is coupled to a main body (housing) of the image forming device 10 via an appropriate movable support member such as a hinge (not illustrated). FIG. 1 illustrates a state in which the automatic document feeder 18 covers the upper surface of the document table 14. When the automatic document feeder 18 covers the upper surface of the document table 14 as illustrated in FIG. 1, the automatic document feeder 18 exhibits its original function.

The automatic document feeder 18 includes a document placement tray 20. On the document placement tray 20, a document, more precisely, a sheet-like document can be placed, and in particular, a plurality of documents can be placed in a stacked manner. Although not described in detail, the automatic document feeder 18 takes in documents placed on the document placement tray 20 one by one (one document at a time), and conveys the documents on a document conveying path 22 in the automatic document feeder 18. On the document conveying path 22, the document passes through the image reading position Pr, and more precisely, passes through the image reading position Pr that is in a fixed state. Thus, the image of the document is read by a so-called flow reading method. Afterwards, the document is discharged to a document discharge tray 24.

An image former 26 is provided as an image forming mechanism below the image scanner 12. The image former 26 executes an image forming process of forming an image, based on appropriate image data such as the above-described read image data, on a sheet-like image recording medium (not illustrated), for example, a paper sheet. That is, the image former 26 executes printing. The printing is performed by a known electrophotographic method. The image former 26 employs a tandem method to perform color printing.

Specifically, the image former 26 includes four process units (also referred to as "image forming stations") 28, 28, . . . as monochrome toner image forming mechanism that individually form monochrome toner images (not illustrated) of a plurality of different colors, for example, four colors including yellow, magenta, cyan, and black. In addition, the image former 26 includes an exposure device 30 serving as an exposure mechanism that provides exposure necessary for forming a monochrome toner image by each of the process units 28, 28, . . . . The image former 26 includes a transfer unit 34 as a transfer mechanism that sequentially transfers monochrome toner images formed by the process units 28, 28, . . . onto an intermediate transfer belt 32 described later, and transfers the toner images transferred onto the intermediate transfer belt 32 onto a sheet. In addition, the image former 26 includes a fixing device 36 as a fixer that fixes the toner image transferred onto the sheet to the sheet. Furthermore, the image former 26 includes four toner replenishment devices 37, 37, . . . that each individually replenish toner (not illustrated) to a corresponding one of development devices 50, 50, . . . (described later) of each of the process units 28, 28, . . . . The image former 26 includes an image sensor 38 as a toner image density detector used as a known sensor for process control.

The transfer unit 34 includes the intermediate transfer belt (also referred to as a "primary transfer belt") 32, a driving roller 39 that rotates the intermediate transfer belt 32, and a driven roller 40 that stretches the intermediate transfer belt 32 together with the driving roller 39. The transfer unit 34 includes four intermediate transfer rollers (also referred to as "primary transfer rollers") 42, 42, . . . provided at positions corresponding to the process units 28, 28, . . . on an inner side of the intermediate transfer belt 32, and a transfer roller (also referred to as "secondary transfer roller") 44 as a transfer member.

The intermediate transfer belt 32 is stretched by the driving roller 39 and the driven roller 40. The driving roller 39 rotates by receiving a driving force from a motor (not illustrated) as an intermediate transfer belt driver, and rotates, for example, counterclockwise in FIG. 1. Accordingly, the intermediate transfer belt 32 rotates (circulates) in the same direction, and the driven roller 40 also rotates in the same direction. A region 32*a* on a lower side of a region between the driving roller 39 and the driven roller 40 in the intermediate transfer belt 32 stretches along the horizontal direction, and the process units 28, 28, . . . are arranged so as to face the region 32*a* stretching along the horizontal direction. The region 32*a* of the intermediate transfer belt 32 where the process units 28, 28, . . . are arranged is called an intermediate transfer region. In the intermediate transfer region 32*a*, the intermediate transfer belt 32 moves from the left side to the right side of the image forming device 10, that is, along the sub-scanning direction.

The intermediate transfer belt 32 is an endless belt-type body having flexibility and is formed of a synthetic resin (for example, polyimide or polycarbonate) to which a conductive material such as carbon black is appropriately mixed. Although not described in detail, the driven roller 40 also has a function of preventing looseness of the intermediate transfer belt 32 by applying appropriate tension to the intermediate transfer belt 32.

The process units 28, 28, . . . are provided below the intermediate transfer region 32*a* of the intermediate transfer belt 32 at constant intervals along the movement direction of the intermediate transfer belt 32 in the intermediate transfer region 32*a*, that is, along the sub-scanning direction. As described above, each of the process units 28, 28, . . . individually forms a corresponding one of monochrome toner images of four colors including yellow, magenta, cyan, and black on the intermediate transfer belt 32. Although not apparent from the drawings including FIG. 1, the process units 28, 28, . . . are provided in the order of yellow, magenta, cyan, and black from the upstream side to the downstream side in the movement direction of the intermediate transfer belt 32 in the intermediate transfer region 32*a* (from the left side to the right side in FIG. 1). However, this order is merely an example, and the disclosure is not limited thereto. The process units 28, 28, . . . have a similar structure, except that the process units 28, 28, . . . each form a monochrome toner image of a different color on the intermediate transfer belt 32.

Each of the process units 28 includes a photoreceptor drum 46, a charging device 48, a development device 50, a cleaning device 52, and a charge removing device (not illustrated).

The photoreceptor drum 46 is an image carrier that carries an electrostatic latent image and a monochrome toner image, which will be described later, and includes a cylindrical substrate formed of a conductive material such as aluminum. A photosensitive layer is formed on a front surface (outer peripheral surface) of the substrate. The photoreceptor drum 46 is provided in the intermediate transfer region 32*a* so that the front surface of the substrate abuts against the outer surface of the intermediate transfer belt 32. In this state, the photoreceptor drum 46 rotates by receiving a driving force from a motor (not illustrated) serving as a drum driver, and rotates clockwise in FIG. 1, for example. The photoreceptor drum 46 rotates at a speed in accordance with the movement speed of the intermediate transfer belt 32. More precisely, the photoreceptor drum 46 rotates at a speed at which the circumferential speed of the substrate is slightly lower than the movement speed of the intermediate transfer belt 32 by, for example, 0.1% to 0.3%. This is to facilitate the transfer of the monochrome toner image formed as described below on the surface of the photoreceptor drum 46 onto the outer surface of the intermediate transfer belt 32, in other words, to prevent a phenomenon in which the monochrome toner image is not appropriately transferred from the surface of the photoreceptor drum 46 to the outer surface of the intermediate transfer belt 32, in particular, a phenomenon in which an inner portion of a character is not transferred.

The charging device 48 is a charger that charges the surface of the photoreceptor drum 46 to a predetermined potential. The surface of the photoreceptor drum 46 charged to the predetermined potential by the charging device 48 is exposed to light by the exposure device 30 mentioned above. The exposure device 30 is provided below the arrangement region of the process units 28, 28, . . . and exposes the surface of the photoreceptor drum 46 of each of the process units 28 from below. That is, the exposure device 30 irradiates the surface of the photoreceptor drum 46 with light of an aspect in accordance with image data to be printed. Thus, an electrostatic latent image of an aspect in accordance with the image data to be printed is formed on the surface of the photoreceptor drum 46. For example, the exposure device 30 is a laser scanning unit including a laser diode (not illustrated) as a light source, a polygon mirror as a deflector, and the like. However, instead of the laser scanning unit, an LED unit including an LED array in which LEDs as light sources are arranged may be employed as the exposure device 30.

The development device 50 is a developing device that develops the electrostatic latent image formed on the surface of the photoreceptor drum 46. That is, the development device 50 stirs the toner as described below, to charge the toner, and causes the charged toner to be attached to the electrostatic latent image on the photoreceptor drum 46, to visualize the electrostatic latent image as a monochrome toner image and thus develop the electrostatic latent image.

The monochrome toner image visualized by the development device 50 developing the electrostatic latent image is transferred from the surface of the photoreceptor drum 46 to the outer surface of the intermediate transfer belt 32 at an abutment position between the surface of the photoreceptor drum 46 and the outer surface of the intermediate transfer belt 32, that is, the monochrome toner image is transferred by so-called intermediate transfer (primary transfer). Therefore, each of the intermediate transfer rollers 42 is provided so as to face a corresponding one of the photoreceptor drums 46 with the intermediate transfer belt 32 interposed therebetween. The intermediate transfer roller 42 is provided so that a surface (outer circumferential surface) of the intermediate transfer roller 42 abuts against the inner surface of the intermediate transfer belt 32, and rotates by receiving a driving force generated by the rotation of the intermediate transfer belt 32, that is, rotates counterclockwise in FIG. 1. When a predetermined intermediate transfer voltage is applied to the intermediate transfer roller 42 from an intermediate transfer power source (not illustrated), a transfer electric field is formed between the surface of the photoreceptor drum 46 and the outer surface of the intermediate transfer belt 32. By the action of the transfer electric field, the monochrome toner image on the photoreceptor drum 46 is transferred onto the intermediate transfer belt 32.

As described above, monochrome toner images of the four colors including yellow, magenta, cyan, and black are individually formed on the intermediate transfer belt 32. The monochrome toner images of the four colors are superimposed on each other to form a color toner image on the intermediate transfer belt 32.

The (color) toner image formed on the intermediate transfer belt 32 is transferred to a sheet at a transfer nip portion Nt which is an abutment portion between the intermediate transfer belt 32 and the transfer roller 44. Specifically, the transfer roller 44 is provided at a position facing the driving roller 39 with the intermediate transfer belt 32 interposed therebetween, so that the intermediate transfer belt 32 is pressed between the transfer roller 44 and the driving roller 39. The transfer roller 44 rotates by receiving a driving force generated by the rotation of the intermediate transfer belt 32, that is, rotates clockwise in FIG. 1. Furthermore, a transfer bias current having the same polarity as the charging polarity of the toner is applied from a transfer bias power source (not illustrated) to the driving roller 39. Thus, a transfer electric field is formed between the intermediate transfer belt 32 and the transfer roller 44, that is, at the transfer nip portion Nt. When the sheet passes through the transfer nip portion Nt in this state, the toner image on the intermediate transfer belt 32 is transferred onto the sheet.

The cleaning device 52 is a cleaner that removes residual toner on the photoreceptor drum 46 after the monochrome toner image is transferred from the photoreceptor drum 46 onto the intermediate transfer belt 32. The charge removing device (not illustrated) is a charge remover that removes static electricity on the photoreceptor drum 46 after the residual toner is removed by the cleaning device 52. After the static electricity is removed by the charge remover, the steps subsequent to the charging by the charging device 48 described above are repeated.

The fixing device 36 is provided on the downstream side of the transfer nip portion Nt in a transport direction of the sheet conveyed along a sheet conveying path 54 described later. As described above, the fixing device 36 fixes the toner image on the sheet to the sheet. More specifically, the fixing device 36 fixes the toner image to the sheet by heating and melting the toner image and further pressing the toner image. Therefore, the fixing device 36 includes a heating belt 56, a heating roller 58, a fixing roller 60, a pressure roller 62, and the like.

The heating belt 56 is an endless belt-type body having flexibility, and is formed of a synthetic resin (for example, polyimide or polycarbonate) having high thermal conductivity. The heating belt 56 is stretched by the heating roller 58 and the fixing roller 60. The heating roller 58 includes a cylindrical substrate (heat conductive layer) having high thermal conductivity, and a heat source is provided inside the cylindrical substrate. The heat source is a lamp heater such as a halogen lamp, and receives heating power supplied from a heater heating power source (not illustrated) for heating. The fixing roller 60 is a columnar roller member and includes a metal core and an elastic layer covering the metal core. That is, the heating roller 58 and the fixing roller 60 extend in parallel with each other, and are in contact within the heating belt 56. The fixing roller 60 rotates by receiving a driving force from a motor (not illustrated) as a heating belt driver, and rotates counterclockwise in FIG. 1, for example. Accordingly, the heating belt 56 rotates (circulates) in the same direction as the fixing roller 60, and the heating roller 58 also rotates in the same direction as the fixing roller 60.

The pressure roller 62 is a columnar roller member and includes a metal core, an elastic layer covering the metal core, and a release layer covering the elastic layer. The pressure roller 62 is provided at a position facing the fixing roller 60 with the heating belt 56 interposed therebetween, so as to press the heating belt 56 between the pressure roller 62 and the fixing roller 60. That is, the pressure roller 62 is provided so as to extend along a rotation axis direction of the fixing roller 60, in other words, so as to extend along a rotation axis direction of the heating belt 56. The pressure roller 62 rotates by receiving a driving force generated by the rotation of the heating belt 56, that is, rotates clockwise in FIG. 1. The fixing nip portion Nf, which is a portion where the heating belt 56 is pressed by the pressure roller 62, is located in the sheet conveying path 54 described later. When the sheet passes through the fixing nip portion Nf, the toner image on the sheet is heated and melted, and further pressed and fixed to the sheet.

The fixing device 36 includes a temperature sensor that detects a surface temperature (fixing temperature) of the heating belt 56. The temperature sensor is not described in detail or depicted in the drawings. Based on the detection result by the temperature sensor, the heating temperature of the heating roller 58 by the above-described heat source is controlled, and thus, the surface temperature of the heating belt 56 is controlled. For example, a thermistor is used as the temperature sensor, but the temperature sensor is not limited to the thermistor. In the fixing device 36, a configuration may be employed in which the heating belt 56 is not provided, the fixing roller 60 also serves as the heating roller 58, and the fixing nip portion Nf is formed by a direct abutment portion between the fixing roller 60 and the pressure roller 62.

Each of the toner replenishment devices 37 replenishes toner to a corresponding one of the development devices 50. The toner replenishment device 37 will be described in detail later, but a toner cartridge 63 is attached to the toner replenishment device 37. The toner cartridge 63 is attachable to and detachable from a mounting portion (not illustrated) of the toner replenishment device 37, and is appropriately replaced in accordance with the degree of consumption of the toner in the toner cartridge 63.

As described above, the image sensor 38 is a toner image density detector used as a known process control sensor, and is, for example, a reflective photoelectric sensor. The process control is an automatic density adjustment function that adjusts a driving parameter of an appropriate element of each of the process units 28, and adjusts, for example, a charging bias voltage applied to the charging device 48 and a developing bias voltage supplied to the development device 50, so that the toner consumption amount is constant with respect to constant image data. When this adjustment is carried out by the process control, a test toner image (patch) is formed on the intermediate transfer belt 32 by each of the process units 28. The image sensor 38 is used to detect the density of the test toner image. Therefore, the image sensor 38 is provided below a position close to an end portion on the downstream side of the intermediate transfer region 32*a* in the rotation direction of the intermediate transfer belt 32, in a state in which a light emitter and a light receiver (not illustrated) of the image sensor 38 are directed upward, that is, the light emitter and the light receiver are directed to the outer surface of the intermediate transfer belt 32. As described above, the process control is known, and thus, further detailed description will be omitted. The image sensor 38 is also used as a sensor for resist adjustment to correct a positional deviation of each monochrome toner image formed on the intermediate transfer belt 32 by each of the process units 28, 28, . . . . However, the resist adjustment is also known, and thus, detailed description thereof will be omitted.

Furthermore, below the image former 26, in other words, at a lower portion in the image forming device 10, a sheet feeder 64 is provided as a sheet feeder. The sheet feeder 64 includes a sheet feeding cassette 66, and a plurality of sheets can be stored in the sheet feeding cassette 66 in a stacked manner. In addition, the sheet feeder 64 includes a pickup roller 68. The sheet feeder 64 takes out sheets stored in the sheet feeding cassette 66 one by one by the pickup roller 68 and supplies the sheets to the sheet conveying path 54 which will be described next.

The sheet conveying path 54 is provided so as to extend from the sheet feeder 64, via the transfer nip portion Nt and the fixing nip portion Nf, to a sheet discharge port 72 leading to an output tray 70. A plurality of conveying rollers (strictly speaking, roller pairs) 74, 74, . . . are provided at appropriate positions on the sheet conveying path 54 to convey sheets along the sheet conveying path 54 from the sheet feeder 64 to the sheet discharge port 72. Note that, among the conveying rollers 74, 74, . . . , a conveying roller 74*a* provided at a position closest to the transfer nip portion Nt on the upstream side of the transfer nip portion Nt in the transport direction of the sheet in the sheet conveying path 54 serves as a resist roller (also referred to as a "paper stop roller") that measures a timing when the sheet passes through the transfer nip portion Nt. Furthermore, among the conveying rollers 74, 74, . . . , a conveying roller 74*b* provided furthermost on the downstream side in the sheet transport direction in the sheet conveying path 54, that is, in the vicinity of the sheet discharge port 72, serves as a sheet discharge roller that discharges the sheet to the output tray 70 via the sheet discharge port 72. The output tray 70 is provided between the image scanner 12 and the image former 26, that is, in a so-called in-body space, but is not limited thereto.

In addition, a conveying path 76 for double-sided printing is provided in the image forming device 10. The conveying path 76 for double-sided printing is a conveying path for taking in a sheet having passed the fixing nip portion Nf, that is, a printed sheet, and supplying the sheet to be printed again. That is, the sheet taken into the conveying path 76 for double-sided printing is supplied again to the sheet conveying path 54 via the conveying path 76, and more specifically, is supplied to the upstream side of the resist roller 74*a*. Thus, the front and back sides of the sheet supplied to the upstream side of the resist roller 74*a* are reversed. Subsequently, printing is performed on the sheet which has been turned over, to realize so-called double-sided printing. A conveying roller 78 is also provided at an appropriate position of the conveying path 76 for double-sided printing.

A bypass tray 80 is provided on a right-side surface of the image forming device 10. A plurality of sheets can be placed on the bypass tray 80 in a stacked manner. When the bypass tray 80 is designated as a sheet supply source, the sheet feeder 64 supplies sheets one by one from the bypass tray 80 to the sheet conveying path 54.

Furthermore, the sheet feeder 64 may include an optional sheet feeding cassette (not illustrated). This optional sheet feeding cassette is provided below the sheet feeding cassette 66. When the optional sheet feeding cassette is designated as the sheet supply source, the sheet feeder 64 supplies sheets one by one from the optional sheet feeding cassette to the sheet conveying path 54. An optional conveying roller 82 that supplies a sheet from the optional sheet feeding cassette to the sheet conveying path 54 is provided at an appropriate position.

Figure 2:
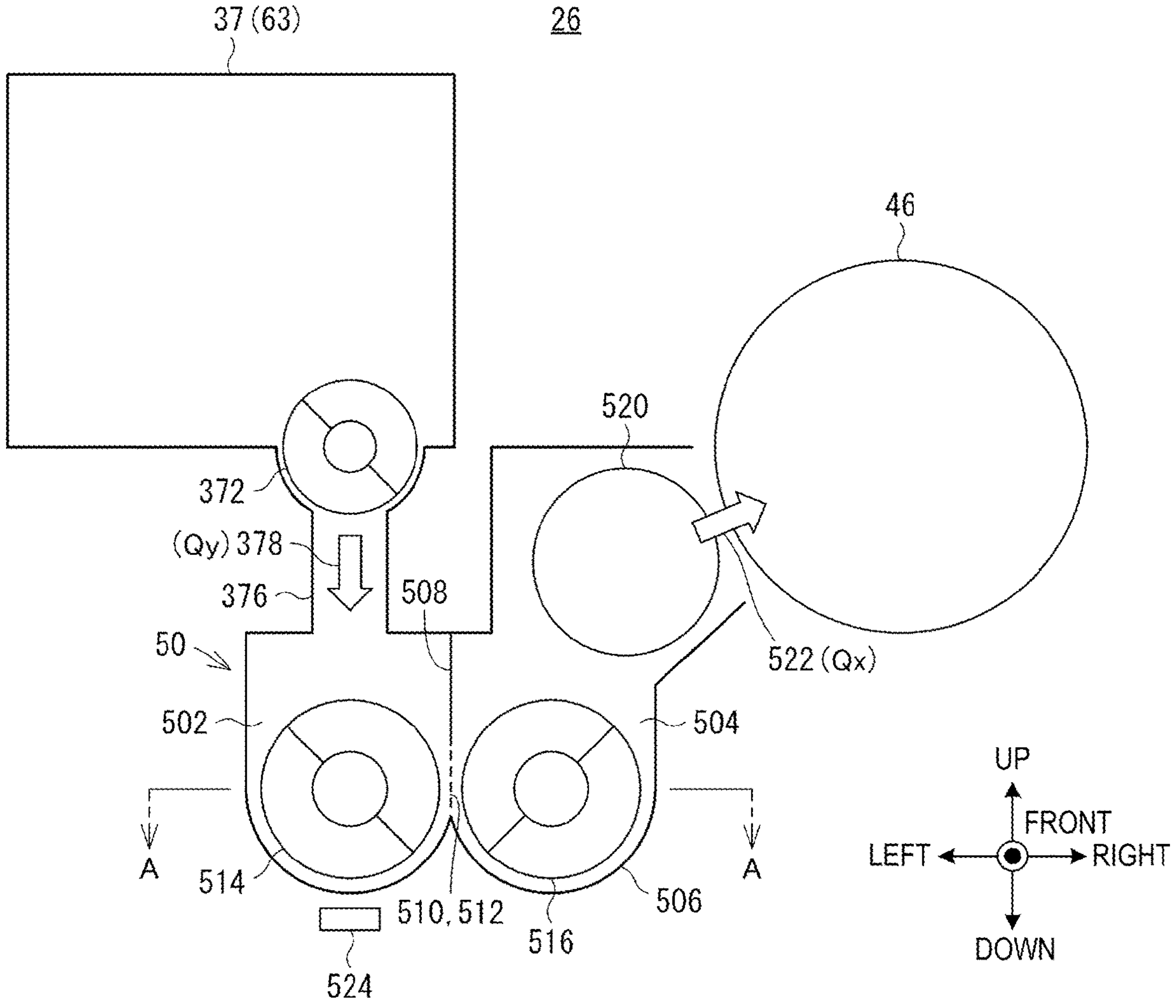
FIG. 2 is a diagram schematically illustrating a configuration of a part of an image former according to the first example.

Regarding the development device 50, as illustrated in FIG. 2, the development device 50 includes a toner container including two spaces, a first chamber 502 and a second chamber 504. The first chamber 502 and the second chamber 504 are formed by a housing 506 of the development device 50.

Figure 3:
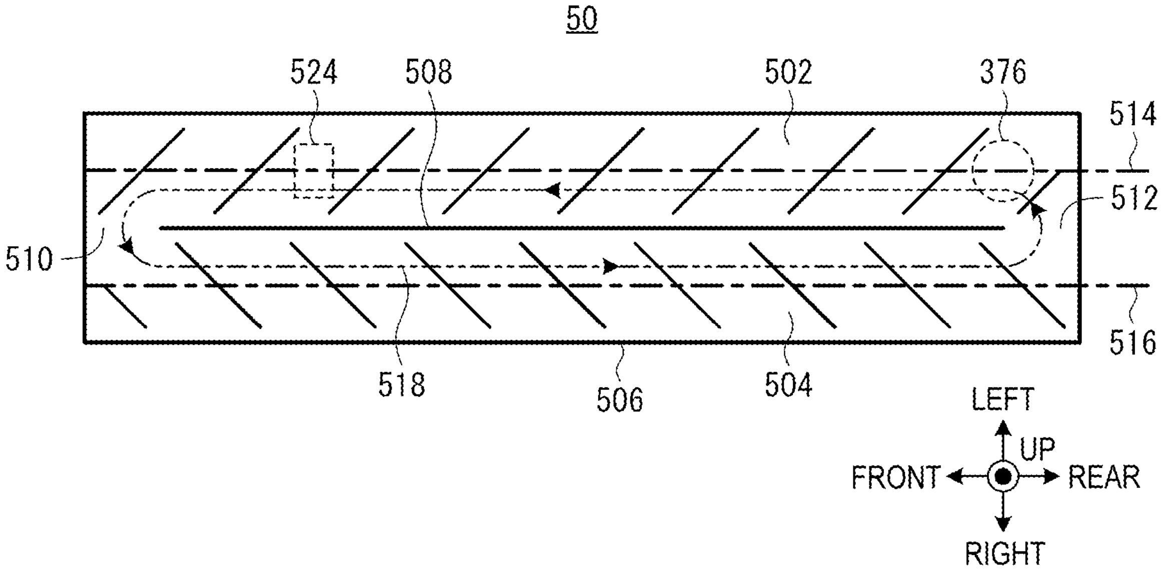
FIG. 3 is a diagram illustrating an end surface at line A-A in FIG. 2.

Referring also to FIG. 3 illustrating an end surface along a line A-A in FIG. 2, the first chamber 502 and the second chamber 504 are elongated spaces extending in parallel with each other. The first chamber 502 and the second chamber 504 are partitioned from each other by a partition wall 508, and communicate with each other via two communicating portions 510 and 512 provided in the vicinity of end portions of the first chamber 502 and the second chamber 504, respectively. The first chamber 502 includes a first conveying screw 514, and the second chamber 504*b* includes a second conveying screw 516. Furthermore, developer (not illustrated) including toner is stored in the first chamber 502 and the second chamber 504. The developer is a two-component developer including a carrier in addition to the toner. The toner is a non-magnetic substance, and the carrier is a magnetic substance.

The first conveying screw 514 and the second conveying screw 516 rotate by receiving a driving force from a motor (not illustrated) serving as a developing driver, and more precisely, rotate by receiving the driving force via an appropriate gear (not illustrated) serving as a driving force transmitter. Thus, the developer stored in the first chamber 502 and the second chamber 504 is conveyed so as to circulate between the first chamber 502 and the second chamber 504 via the two communicating portions 510 and 512, as indicated by a two-dot chain line arrow 518 in FIG. 3. At this time, the developer, that is, the toner and the carrier included in the developer, are stirred and charged by the friction from the stirring.

The developer charged as described above is attracted to the surface of a developing roller 520 by a magnetic force generated by a magnet (not illustrated) in the developing roller 520 provided above the second chamber 504. The developing roller 520 is provided in a state in which a surface thereof is close to the surface of the photoreceptor drum 46, and rotates by receiving a driving force from the motor serving as the above-described developing driver. As the developing roller 520 rotates, the developer on the surface of the developing roller 520 is transported to the vicinity of the surface of the photoreceptor drum 46. Subsequently, only the toner in the developer on the surface of the developing roller 520 adheres to the electrostatic latent image on the surface of the photoreceptor drum 46, and the electrostatic latent image is visualized as a toner image, that is, the electrostatic latent image is developed. At this time, the developing bias voltage mentioned above is applied to the developing roller 520 from a developing bias power source (not illustrated). Afterwards, as the developing roller 520 rotates, the developer on the surface of the developing roller 520 is further transported toward the second chamber 504, and is caused to return to the second chamber 504. After returning to the second chamber 504, the developer is stirred while being conveyed again between the second chamber 504 and the first chamber 502.

The toner cartridge 63 includes a supply screw 372, and when the supply screw 372 is rotationally driven by the toner replenishment device 37, the first chamber 502 of the development device 50 is replenished with toner from the toner cartridge 63. Although not illustrated in FIGS. 2 and 3, the toner replenishment device 37 includes a toner supply motor 374 (see FIG. 6) as a toner supply driver that rotates the supply screw 372. A replenishment amount of the toner can be controlled by changing a rotation time of the supply screw 372, that is, a driving condition of the toner replenishment device 37 (the toner supply motor 374). An appropriate toner replenishment path 376 is provided from the toner cartridge 63 to the first chamber 502 of the development device 50. The toner replenished to the first chamber 502 via the toner replenishment path 376 is replenished from above the first chamber 502, as illustrated in FIG. 2, and more specifically, is replenished to the vicinity of the one communicating portion 512 (on the rear side of the image forming device 10) in the first chamber 502, as illustrated in FIG. 3.

Below the first chamber 502, a toner concentration sensor 524 (FIG. 2) is provided as an example of a toner concentration detector that detects a concentration (a mass ratio of the toner with respect to the carrier) T/D of the toner included in the developer in the first chamber 502. The toner concentration sensor 524 is a so-called magnetic permeability sensor, and measures the magnetic permeability of the developer to detect a bulk density of the carrier included in the developer, and thus detects the toner concentration T/D. As illustrated in FIG. 3, the toner concentration sensor 524 is provided slightly more to the front side of the image forming device 10 than the central portion of the first chamber 502 in the front-rear direction of the image forming device 10, but is not limited thereto. The position of the toner concentration sensor 524 in the front-rear direction of the image forming device 10 is not particularly limited, as long as the position is separated from a replenishment portion where the first chamber 502 is replenished with toner via the toner replenishment path 376. Furthermore, the toner concentration sensor 524 may be provided below the second chamber 504.

The toner concentration sensor 524 outputs, in accordance with the toner concentration T/D, a toner concentration detection signal Sa which is an analog signal having a voltage from 0 V to 3.3 V, for example. The toner concentration detection signal Sa is converted into a digital signal of 8 bits, that is, is converted into a toner concentration detection value Sd which is a digital value from 0 to 255.

The toner concentration detection value Sd is adjusted so that the toner concentration detection value Sd is equivalent to a predetermined reference value Sda (for example, 128) when a standard developer having a toner concentration T/D of 7% is stored in the first chamber 502 and the second chamber 504. When the amount of toner in the development device 50 changes, the toner concentration detection value Sd changes as indicated by a thick solid line X in FIG. 4. However, it is known that, when the toner concentration T/D is 7%, the toner concentration detection value Sd is equivalent to the predetermined reference value Sda. Therefore, the toner concentration T/D in the development device 50 can be determined from the toner concentration detection value Sd.

Figure 4:
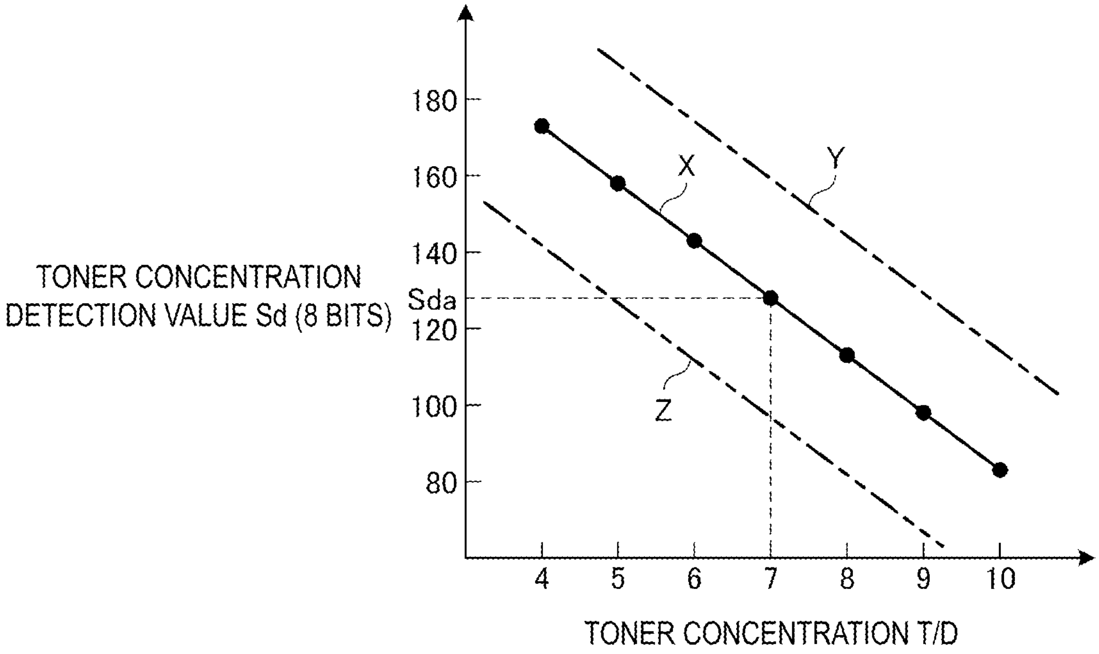
FIG. 4 is a graph showing a relationship between the concentration of toner stored in a toner container of a development device and a toner concentration detection value detected by a toner concentration sensor in the first example.

The thick solid line X in FIG. 4 indicates a relationship between the toner concentration T/D and the toner concentration detection value Sd in an environment of a temperature θ of 25° C. and a humidity ρ of 50%. From the thick solid line X, it can be understood that the toner concentration T/D and the toner concentration detection value Sd are inversely proportional to each other. For example, as the toner concentration T/D increases, that is, as the amount of toner in the developer increases, the carrier density in the developer decreases (low density), and thus, the toner concentration detection value Sd decreases. Furthermore, as the toner concentration T/D decreases, the carrier concentration in the developer increases (high density), so that the toner concentration detection value Sd increases. Note that the gradient of the thick solid line X is known in advance from experimental data.

A controller 100 described later controls the toner replenishment device 37 so that the toner concentration T/D in the development device 50 is equivalent to the reference value Sda, for example. Here, when the toner is consumed by image formation and the amount of toner in the development device 50 decreases, the toner concentration detection value Sd is greater than the reference value Sda (the toner concentration T/D is lower than an appropriate value of 7%). Therefore, the controller 100 controls the toner replenishment device 37 so that the toner concentration detection value Sd is equivalent to the reference value Sda. On the other hand, when the toner concentration detection value Sd is less than the reference value Sd of "a" (the toner concentration T/D is higher than the appropriate value of 7%), the controller 100 performs control by forcibly developing an image at a time when no image is formed, for example, so that the toner concentration detection value Sd is equivalent to the reference value Sda.

As described above, by controlling the toner replenishment device 37, based on the toner concentration detection value Sd of the toner concentration sensor 524, the toner concentration T/D in the development device 50 can be always kept constant. Here, the reason why a toner concentration T/D of 7% is used as the appropriate value is as follows. When the toner concentration T/D is 7%, the toner used in the image forming device 10 of the present first example is easily charged (easily controlled) to a charge amount at which stable development and transfer are possible. The appropriate value of the toner concentration T/D may be appropriately set in accordance with specifications of the toner to be used.

Here, the relationship between the toner concentration T/D and the toner concentration detection value Sd changes depending on a surrounding environment, and particularly changes depending on the temperature θ and the humidity ρ. For example, when the temperature θ and the humidity ρ increase, the charge amount of the toner decreases and the toner concentration detection value Sd is higher than an original value. Therefore, in a (so-called high-temperature and high-humidity) environment where the temperature θ and the humidity ρ are relatively high, the relationship between the toner concentration T/D and the toner concentration detection value Sd is a relationship such as indicated by a thick one-dot chain line Y in FIG. 4, that is, the toner concentration detection value Sd is higher than the actual toner concentration T/D. On the other hand, when the temperature θ and the humidity ρ decrease, the charge amount of the toner increases and the toner concentration detection value Sd is lower than the original value. Therefore, in a (so-called low-temperature and low-humidity) environment where the temperature θ and the humidity ρ are relatively low, the relationship between the toner concentration T/D and the toner concentration detection value Sd is a relationship such as indicated by a thick two-dot chain line Z in FIG. 4, that is, the toner concentration detection value Sd is lower than the actual toner concentration T/D.

Regarding such a change in the environment as described above, an environment sensor is provided in the image forming device 10, and control for changing the reference value Sda (that is, a threshold value) serving as a determination criterion is generally performed based on a detection result by the environment sensor. However, when the image forming device 10 stands unused during a long period of time and the charge amount of the toner decreases, the toner concentration detection value Sd is greater than a value representing the actual toner concentration T/D (so-called deceptive value). Therefore, the image forming device 10 determines that the toner amount is insufficient and replenishes an excessive amount of toner.

As a result, the charge amount of the toner further decreases and an image defect such as "fogging" may occur. In addition, the toner concentration sensor 524 needs to be provided at a position separated from a replenishment portion (position) of the toner. Therefore, when a large number of images having a printing rate Rx of 100% are formed and the toner concentration in the development device 50 decreases during a short period of time, the detection may be delayed and it may not be possible to replenish a sufficient amount of toner, for example.

Next, a description will be given of how the development device 50 is replenished with toner in the present first example.

As indicated by a hollow arrow 378 in FIG. 2, a required toner amount Qy, which is an amount of toner to be replenished from the toner cartridge 63 to the first chamber 502 of the development device 50 during image formation, generally needs to be equivalent to a toner consumption amount Qx indicated by another hollow arrow 522 in FIG. 2. However, it is not possible to directly measure the toner consumption amount Qx. Therefore, in the present first example, the toner consumption amount Qx is estimated based on image data provided for printing, that is, based on pixel data included in the image data, and more precisely, based on the printing rate Rx obtained from the pixel data, and the estimated toner consumption amount Qx is used as the required toner amount Qy necessary for replenishment.

FIG. 5 is a table showing a relationship between the printing rate Rx and the required toner amount Qy. FIG. 5 shows the required toner amount Qy determined by proportional calculation for each printing rate Rx using as a reference (100%) the amount of toner to be adhered to the sheet in order to obtain a printing rate Rx of 100% for an A4-size sheet, that is, in order to obtain a sheet actually having a uniform density on its entire surface. In the present first example, the required toner amount Qy to obtain a printing rate Rx of 100% is 0.370 g. The value 0.370 g is an actual measurement value, that is, a value determined in accordance with the specifications and the like of the toner to be used in the image forming device 10 of the present first example, and is an exemplary value. This value varies depending on the specifications of the toner, the development device, the transfer device, and the like which are actually used, and thus, the value may be appropriately set to a value suitable for the specifications actually used.

The relationship between the printing rate Rx and the required toner amount Qy will be described with reference to FIG. 5. As described above, the required toner amount Qy in a case where the printing rate Rx is 100% (so-called solid image) is set to 0.370 g, based on the actual measurement value. The required toner amount Qy at each printing rate Rx can be calculated by multiplying the printing rate Rx by 0.370 g, which is the required toner amount Qy when the printing rate Rx is 100%. For example, the required toner amount Qy at a printing rate Rx of 20% is 0.074 g (=0.370 g*0.2), and the required toner amount Qy at a printing rate Rx of 5% is 0.019 g (=0.37 g*0.05). As described above, the required toner amount when the printing rate Rx is different from 100% can be calculated by a proportional calculation using the required toner amount Qy when the printing rate Rx is 100% as a reference.

FIG. 5 also shows a required toner replenishment time Ty (=Qy/Vq) which is a time period required for replenishing the required toner amount Qy, that is, a driving time of the toner replenishment device 37. Here, Vq is a toner replenishment speed by the toner replenishment device 37.

The toner replenishment device 37 used in the present first example has a toner replenishment speed Vq per second of 0.3 g/s. The toner replenishment speed Vq of 0.3 g/s is also an example, and the toner replenishment speed Vq may be appropriately set in accordance with the performance of the toner replenishment device 37 to be used.

The required toner replenishment time Ty can be calculated by dividing the required toner amount Qy by the toner replenishment speed Vq. For example, when the required toner amount Qy is 0.019 g (the printing rate Rx is 5%), the required toner replenishment time Ty is 0.063 s (=0.019 g/0.3 g/s). When the required toner amount Qy is 0.074 g (the printing rate Rx is 20%), the required toner replenishment time Ty is 0.247 s (=0.074 g/0.3 g/s). When the required toner amount Qy is 0.370 g (the printing rate Rx is 100%), the required toner replenishment time Ty is 1.233 s (=0.370 g/0.3 g/s).

Here, the image forming device 10 according to the present first example has a printing speed of 45 sheets per minute (45 CPM) when using an A4-size sheet oriented in landscape (that is, an A4-size sheet of which the longer direction is set along the main scanning direction). Therefore, the time required to form an image on an A4-size sheet oriented in landscape including a time in-between sheets is 1.33 s (=60 s/45), which is longer than the required toner replenishment time Ty (=1.233 s) when the printing rate Rx is 100%. That is, the toner replenishment device 37 according to the present first example can replenish a sufficient amount of toner within a time during which a sheet is fed, even when an image having a printing rate Rx of 100% is formed.

As described above, the required toner amount Qy is calculated based on the printing rate Rx. However, depending on the charge amount, the fluidity, the developing conditions, or the like of the toner, the toner consumption amount Qx when the printing rate Rx is 100% may be less or great than a value (in this case, 1.233 g) determined in advance by an experiment.

Therefore, if toner is replenished in the same amount (100%) as the required toner amount Qy calculated based on the printing rate Rx, the toner may be excessively replenished depending on the conditions, and an image defect such as "fogging" may occur.

Therefore, in the present first example, the required toner amount Qy is calculated based on the printing rate Rx, and the toner is replenished in an amount corresponding to a first replenishment amount Q1 of the required toner amount Qy. The remaining toner of the required toner amount Qy, that is, toner in an amount corresponding to a second replenishment amount Q2 obtained by subtracting the first replenishment amount Q1 from the required toner amount Qy is replenished, based on the toner concentration detection value Sd of the toner concentration sensor 524. More specifically, toner is replenished so that the toner concentration detection value Sd is equivalent to a reference value Sda described later, and as a result, the toner is replenished in an amount corresponding to the second replenishment amount Q2. Here, the first replenishment amount Q1 is set to a value greater than the second replenishment amount Q2.

More specifically, the first replenishment amount Q1 is set to an amount corresponding to 95% of the required toner amount Qy, and an amount corresponding to the remaining 5% of the required toner amount Qy is used as the second replenishment amount Qy. As described above, the toner is replenished in an amount corresponding to the first replenishment amount Q1 (an amount corresponding to 95% of the required toner amount Qy in the present first example) of the required toner amount Qy determined based on the printing rate Rx, while the toner is replenished in an amount corresponding to the remaining second replenishment amount Q2 (an amount corresponding to 5% of the required toner amount Qy in the present first example) (a so-called missing amount) of the required toner amount Qy, based on the toner concentration detection value Sd of the toner concentration sensor 524. By performing such control, an appropriate amount of toner can be replenished at an appropriate timing for the amount of toner consumed during image formation, without excessively supplying the toner. That is, the toner of the first replenishment amount Q1 determined based on the image data and the toner of the second replenishment amount Q2 determined based on the toner concentration detection value Sd are replenished at a predetermined ratio Q1:Q2 (95%:5% in the present first example) with respect to the required toner amount Qy, and thus, the toner replenishment can be accurately performed with respect to the toner amount actually consumed during image formation.

The first replenishment amount Q1 is determined by Equation 1 below. In Equation 1, $\alpha 1$ is a first replenishment amount calculation adjustment coefficient, and in this case, $\alpha 1=0.95$ (95%). The required toner amount Qy varies depending on the printing rate Rx, but the value of the first replenishment amount calculation coefficient $\alpha 1$ is constant.

$$Q1=Qy*\alpha 1 \qquad \text{Equation 1}$$

According to the experience (experiments), the required toner amount Qy includes an error of +5%. Therefore, if the toner is replenished in the same amount (100%) as the required toner amount Qy, the toner may be excessively replenished. Accordingly, a value obtained by multiplying the required toner amount Qy by a ratio of 95% obtained by subtracting (the maximum value of) the error from the required toner amount Qy is used as the first replenishment amount Q1. However, the present example is not limited thereto, and the ratio may be set to a value equal to or greater than an assumed error.

The second replenishment amount Q2 determined based on the toner concentration detection value Sd is expressed by Equation 2 below. As described above, toner of the second replenishment amount Q2 is replenished so that the toner concentration detection value Sd of the toner concentration sensor 524 is equivalent to the reference value Sda, and as a result (ideally), the toner is replenish in an amount corresponding to the second replenishment amount Q2.

$$Q2=Qy*(1-\alpha 1) \quad \text{Equation 2}$$

As described above, in a case where the toner concentration T/D of the developer in the development device 50 (in the first chamber 502 and the second chamber 504) is lower than the appropriate value (7%), that is, in a case where the toner amount is insufficient, a problem occurs in which the density of the image (output image) eventually formed on the sheet is insufficient. On the other hand, in a case where the toner concentration T/D of the developer in the development device 50 is higher than the appropriate value, that is, in a case where the toner is in an excessive state, the charge amount of the toner is insufficient, and a problem occur such as a fogging phenomenon in which toner adheres to the sheet in an unintended manner, or toner scattering in which toner scatters to an unintended location. In order to avoid these problems, it is important to supply the development device 50 with toner so that the toner concentration T/D in the development device 50 does not greatly exceed the appropriate value (7%) during image formation. The development device 50 can be supplied with an appropriate amount of toner by replenishing toner of the first replenishment amount Q1 included in the required toner amount Qy in an appropriate replenishment amount Qz calculated based on the image data (the printing rate Rx) and replenishing toner of the remaining second replenishment amount Q2 included in the required toner amount Qy, based on the toner concentration detection value Sd of the concentration sensor 524.

Furthermore, when the image forming device 10 stands unused, an error of the second replenishment amount Q2, which is based on the toner concentration detection value Sd, tends to increase. The reasons therefor are as described above. That is, the charge amount of the toner decreases and the toner concentration detection value Sd of the toner concentration sensor 524 increases (a lower value than the actual value is detected as the toner concentration T/D), and thus, if the toner is replenished depending on the toner concentration detection value Sd, the toner may be excessively replenish.

Therefore, the controller 100 confirms a state of the image forming device 10, and more specifically, confirms a standing time Ta. The standing time Ta is the time from the completion of a previous image forming process until a point in time when a print job instructing execution of a new image forming process is received. When the standing time Ta is equal to or greater than a predetermined threshold time Ts, the controller 100 does not replenish the toner of the second replenishment amount Q2 until a specific time Tb elapses after the start of the new image forming process. That is, during the specific time Tb, the development device 50 is replenished only with toner of the first replenishment amount Q1, that is, only with the necessary minimum amount of toner. Thus, it is possible to avoid an influence onto the image forming device 10 when the toner is replenished, based on an inappropriate (inaccurate) toner concentration detection value Sd immediately after the image forming device 10 stands for a long period of time. The threshold time Ts used herein is, for example, 6 hours. The specific time Tb is, for example, six minutes.

Figure 6:
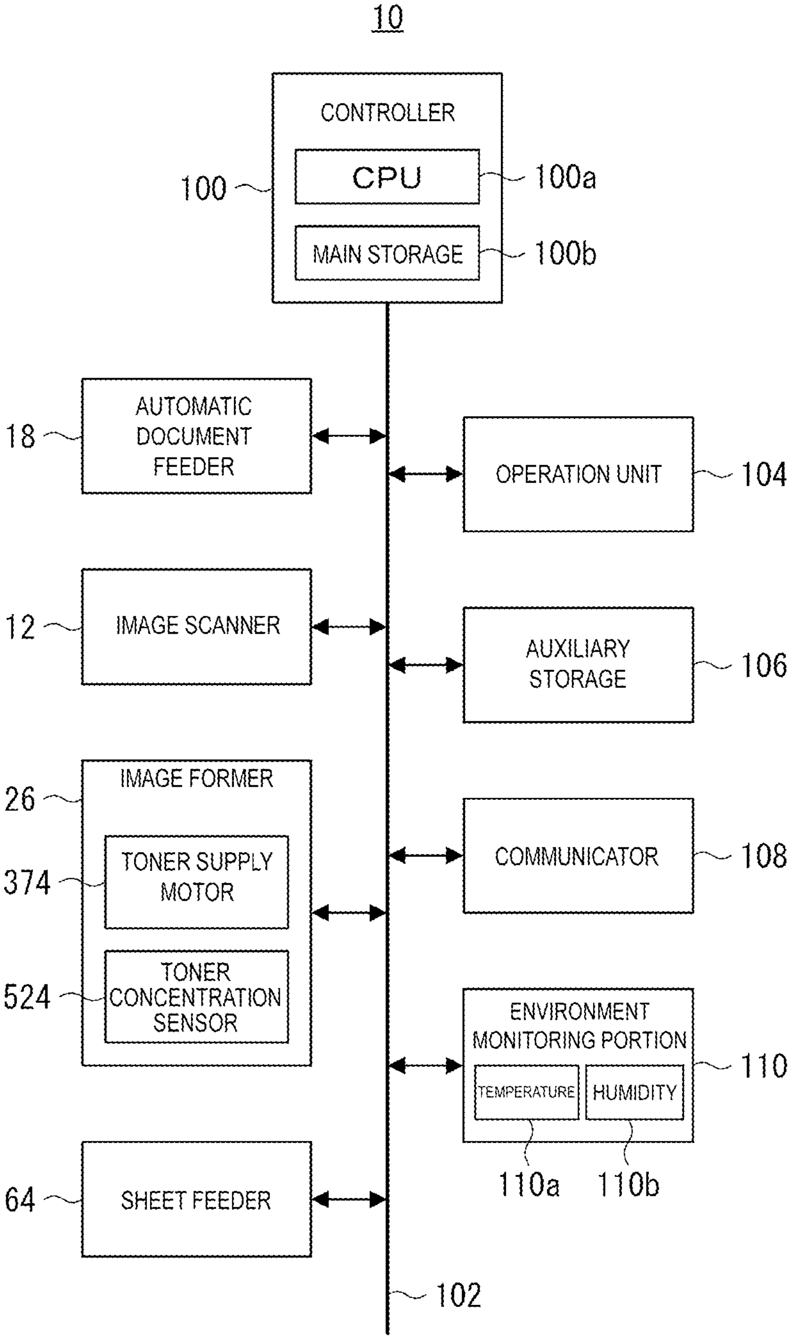
FIG. 6 is a block diagram illustrating an electrical configuration of the image forming device according to the first example.

Next, an electrical configuration of the image forming device 10 will be described, and then, an actual control example in the present first example will be described. FIG. 6 is a block diagram illustrating an electrical configuration of the image forming device 10. As illustrated in FIG. 6, the image forming device 10 includes the controller 100. The image scanner 12, the automatic document feeder 18, the image former 26, and the sheet feeder 64 are connected to the controller 100 via a bus 102. In addition, an operation unit 104, an auxiliary storage 106, a communicator 108, an environment monitoring portion 110, and the like are connected to the controller 100 via the bus 102. The image forming device 10 includes various other elements. However, illustration and description of elements that are not directly related to the gist of the disclosure are omitted here. The image scanner 12, the automatic document feeder 18, the image former 26, and the sheet feeder 64 are configured as described above. In particular, the image former 26 includes the toner supply motor 374 and the toner concentration sensor 524.

The controller 100 is an example of a controller that controls the entirety of the image forming device 10. Therefore, the controller 100 includes a computer as a control executor, for example, a CPU 100*a*. In addition, the controller 100 includes a main storage 100*b* as a main storage that can be directly accessed by the CPU 100*a*. The main storage 100*b* includes, for example, a ROM and a RAM which are not illustrated. Among these, the ROM stores a control program (firmware) that controls an operation of the CPU 100*a*. The RAM constitutes a work area and a buffer area when the CPU 100*a* executes a process according to the control program.

The auxiliary storage 106 is an example of an auxiliary storage. That is, various data such as the above-described read image data is appropriately stored in the auxiliary storage 106. The auxiliary storage 106 includes, for example, a hard disk drive (not illustrated). In addition, the auxiliary storage 106 may include a rewritable nonvolatile memory such as a flash memory.

The communicator 108 is an example of a communicator. That is, the communicator 108 performs two-way communication processing via a LAN line (not illustrated). The communicator 108 may be connected to the LAN line by a wire or by radio. The communicator 108 also performs two-way communication processing via a public switched telephone network (not illustrated).

The environment monitoring portion 110 is an example of a monitor that monitors an environment in which the image forming device 10 is installed. The environment monitoring portion 110 includes a temperature detector 110*a* as one environment sensor and a humidity detector 110*b* as another environment sensor. The temperature detector 110*a* detects the temperature at an appropriate location inside or outside the image forming device 10. The humidity detector 110*b* detects the humidity at an appropriate location inside or outside the image forming device 10. The location where the temperature detector 110*a* detects the temperature and the location where the humidity detector 110*b* detects the humidity may be locations separated from each other, may be locations close to each other, or may include a plurality of locations.

The operation unit 104 includes a display having a touch panel (not illustrated). The display having a touch panel is a component integrally combining a touch panel as an example of an operation receptor which can receive an operation by a user (not illustrated) and a display as an example of a display that displays various types of information. In addition to the display having a touch panel, the operation unit 104 includes an appropriate light emitter such as an LED (not illustrated) and an appropriate hardware switch such as a push button (not illustrated).

The image forming device 10 according to the present first example has the electrical configuration described above.

As described above, according to the present first example, the required toner amount Qy is calculated based on image data (the printing rate Rx). The toner is replenished in an amount corresponding to the first replenishment amount Q1 included in the required toner amount Qy, and based on the toner concentration detection value Sd of the toner concentration sensor 524, the toner is replenished in an amount corresponding to the remaining second replenishment amount Q2 included in the required toner amount Qy. In other words, the first replenishment amount Q1 based on the image data and the second replenishment amount Q2 based on the toner concentration detection value Sd are set to a predetermined ratio Q1:Q2, and the development device 50 is replenished with toner of the total amount including the first replenishment amount Q1 and the second replenishment amount Q2. However, in a state in which the image forming device 10 is continuously not used for the predetermined threshold time Ts or more, and immediately after that, during a time period until an image forming process is started and the specific time Tb elapses, the toner of the second replenishment amount Q2 is not replenished.

Figure 7:
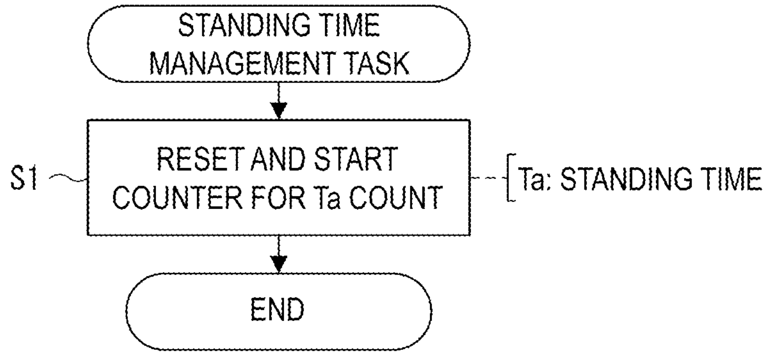
FIG. 7 is a flowchart illustrating a process flow of a standing time management task in the first example.

In order to replenish the toner in such a manner, the controller 100, more precisely, the CPU 100*a* executes a standing time management task in accordance with a standing time management program included in the control program stored in the main storage 100*b*. A processing flow of the standing time management task is illustrated in FIG. 7. The standing time management task is executed when a print job is received and all printing processes based on the print job are completed. The print job mentioned here includes not only a print job of a printer function, but also print jobs of a copy function and a facsimile function (facsimile receiving function).

According to the standing time management task, in step S1, the CPU 100*a* resets a counter (not illustrated) used for counting the standing time Ta and starts an operation of counting the standing time Ta by the counter. The counter mentioned here is a software counter configured by the CPU 100*a*. However, the counter may be a hardware counter provided separately from the CPU 100*a*. After execution of step S1, the CPU 100*a* terminates the standing time management task.

Figure 8:
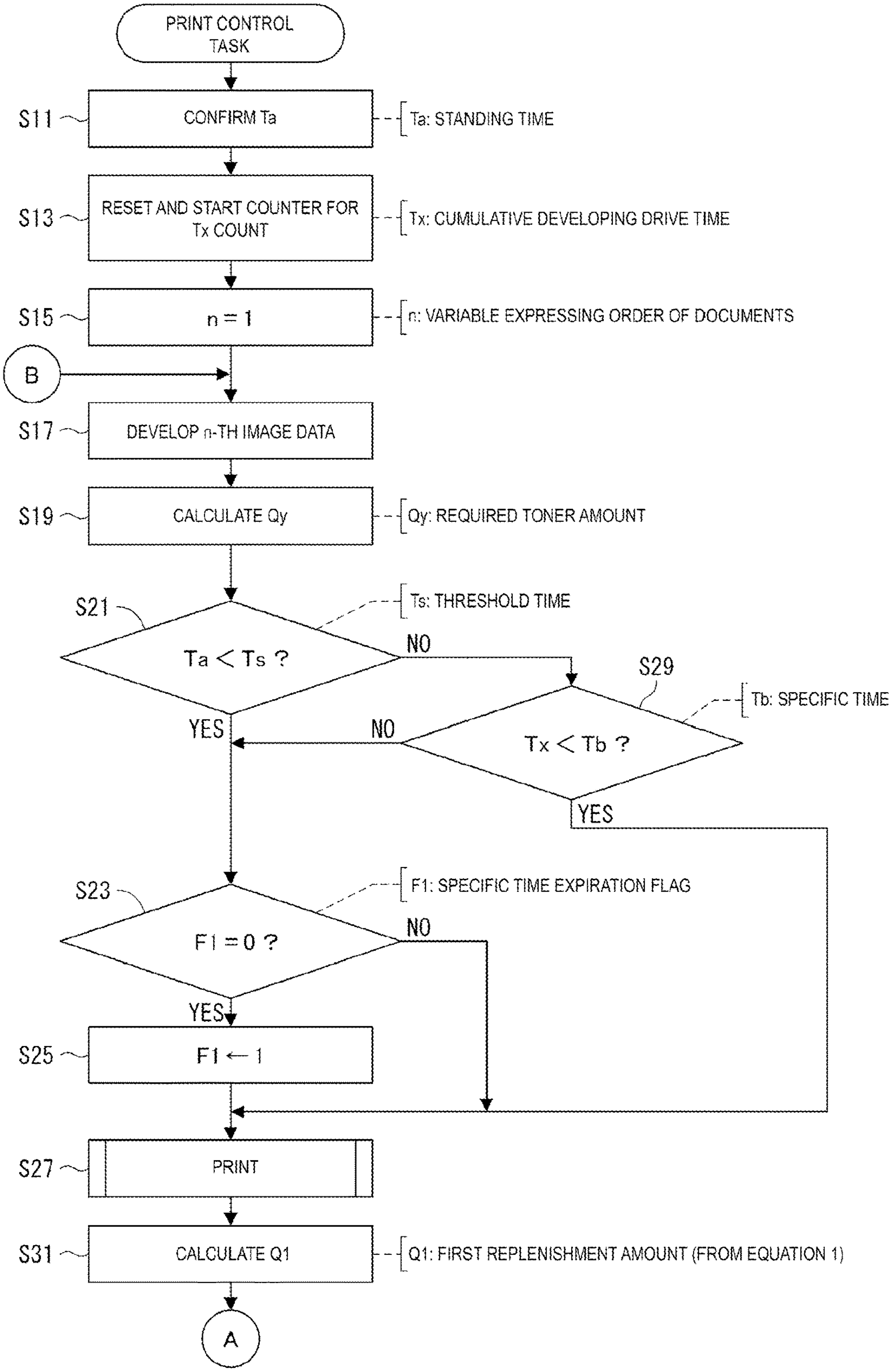
FIG. 8 is a flowchart illustrating a process flow of a part of a print control task in the first example.
Figure 9:
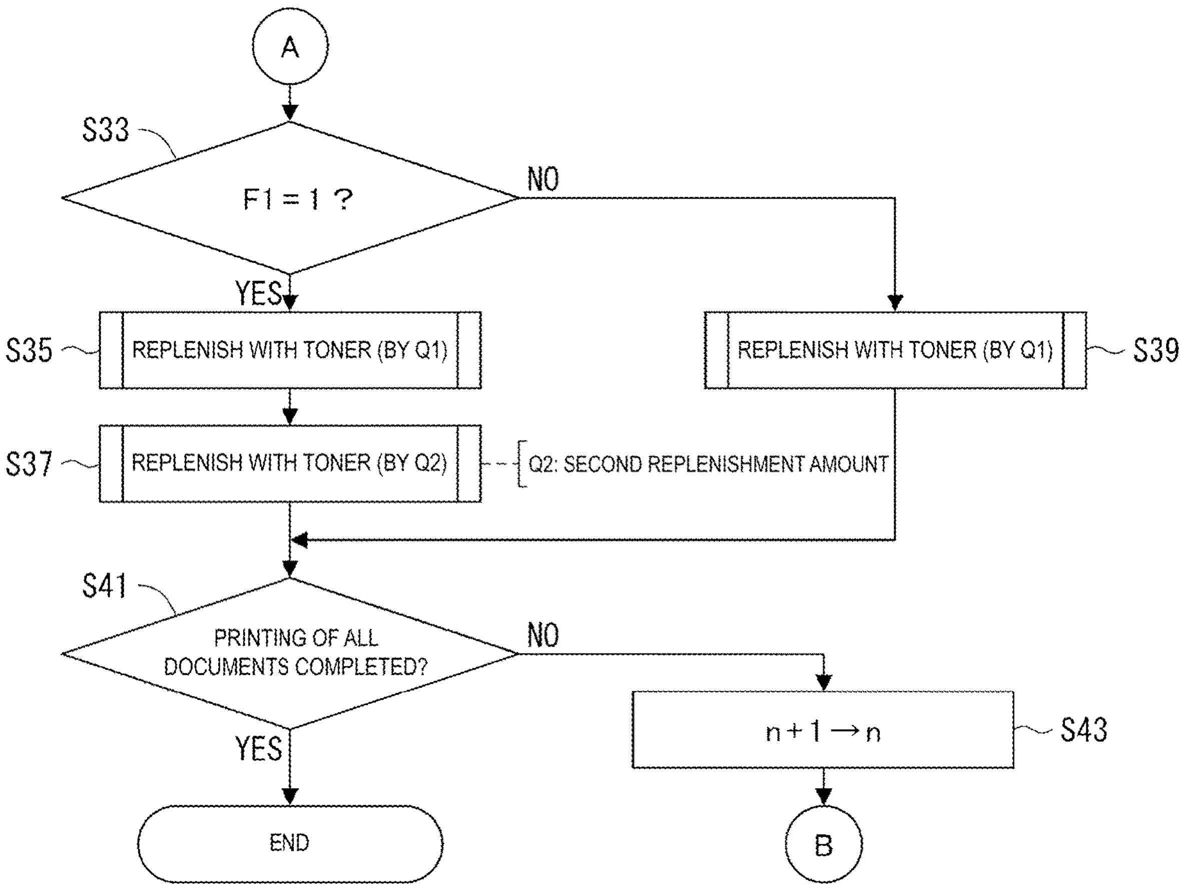
FIG. 9 is a flowchart illustrating a process flow of the remaining part of the print control task in the first example.

In addition, the CPU 100*a* executes a print control task according to a print control program included in the control program. The processing flow of the print control task is illustrated in FIGS. 8 and 9. When a print job is received, the print control task is executed in response to the print job.

According to the print control task, first, in step S11, the CPU 100*a* confirms the standing time Ta. The standing time Ta is managed by the above-described standing time management task, that is, the standing time Ta is counted by a counter that counts the standing time Ta. Subsequently, the CPU 100*a* causes the processing to proceed to step S13.

In step S13, the CPU 100*a* resets a counter (not illustrated) counting a cumulative developing drive time Tx of the development device 50, and causes the counter to start an operation of counting the cumulative developing drive time Tx. The counter mentioned here is also a software counter configured by the CPU 100*a*. However, the counter may be a hardware counter provided separately from the CPU 100*a*. Subsequently, the CPU 100*a* causes the processing to proceed to step S15.

In step S15, the CPU 100*a* sets a variable n representing the order of documents to a value 1 as an initial value. Subsequently, the CPU 100*a* causes the processing to proceed to step S17.

In step S17, the CPU 100*a* develops (analyzes) image data of an n-th document among the image data included in the print job. Subsequently, the CPU 100*a* causes the processing to proceed to step S19.

In step S19, the CPU 100*a* calculates the required toner amount Qy, based on the image data of the n-th document developed in step S17, more precisely, based on pixel data included in the image data, and even more precisely, based on the printing rate Rx determined from the pixel data. Subsequently, the CPU 100*a* causes the processing to proceed to step S21.

In step S21, the CPU 100*a* compares the standing time Ta confirmed in step S11 with the threshold time Ts described above. Here, when the standing time Ta is shorter than the threshold time Ts, that is, when the image forming device 10 is not standing unused for the threshold time Ts or longer, the CPU 100*a* causes the processing to proceed to step S23. On the other hand, when the standing time Ta is equal to or longer than the threshold time Ts, that is, when the image forming device 10 stands unused for the threshold time Ts or longer, the CPU 100*a* causes the processing to proceed to step S29 described later.

In step S23, the CPU 100*a* determines whether a flag F1 is 0. The flag F1 is an indicator indicating whether the specific time Tb elapsed, and is a so-called specific time expiration flag. For example, when the specific time expiration flag F1 is 0, the specific time expiration flag F1 indicates that the specific time Tb has not elapsed. When the specific time expiration flag F1 is 1, the specific time expiration flag F1 indicates that the specific time Tb has elapsed. When the print control task is executed, the specific time expiration flag F1 is set to 0 as an initial value.

In step S23, when the specific time expiration flag F1 is 0, that is, when the specific time Tb has not elapsed, the CPU 100*a* causes the processing to proceed to step S25. On the other hand, when the specific time expiration flag F1 is 1, that is, when the specific time Tb has elapsed, the CPU 100*a* causes the processing to proceed to step S27 described later.

In step S25, the CPU 100*a* sets the specific time expiration flag F1 to 1. Subsequently, the CPU 100*a* causes the processing to proceed to step S27.

In step S27, the CPU 100*a* prints the n-th document. Here, for ease of description, it is assumed that the number of printed sheets of one document is one. Subsequently, the CPU 100*a* causes the processing to proceed to step S31 described later.

When the processing proceeds from step S21 to step S29 described above, the CPU 100*a* compares the cumulative developing drive time Tx with the above-described specific time Tb in step S29. Here, when the cumulative developing drive time Tx is shorter than the specific time Tb, that is, when the specific time Tb has not elapsed yet from immediately after the image forming device 10 stands unused for the threshold time Ts or longer, the CPU 100*a* causes the processing to proceed to step S27. On the other hand, when the cumulative developing drive time Tx is equal to or longer than the specific time Tb, that is, when the specific time Tb elapses from immediately after the image forming device 10 stands unused for the threshold time Ts or longer, the CPU 100*a* causes the processing to proceed to step S23 described above.

In step S31, the CPU 100*a* calculates the first replenishment amount Q1, based on Equation 1 described above. Subsequently, the CPU 100*a* causes the processing to proceed to step S33.

In step S33, the CPU 100*a* determines whether the specific time expiration flag F1 is 1. Here, when the specific time expiration flag F1 is 1, that is, when the specific time Tb has elapsed, the CPU 100*a* causes the processing to proceed to step S35. On the other hand, when the specific time expiration flag F1 is 0, that is, when the specific time Tb has not elapsed, the CPU 100*a* causes the processing to proceed to step S39 described later.

In step S35, the CPU 100*a* replenishes, more precisely, controls the toner supply motor 374 to replenish the development device 50 with toner in an amount corresponding to the first replenishment amount Q1 calculated in step S31 described above. Subsequently, the CPU 100*a* causes the processing to proceed to step S37.

In step S37, the CPU 100*a* replenishes the development device 50 with toner in an amount corresponding to the second replenishment amount Q2, which is expressed by Equation 2 described above, that is, obtained by subtracting the first replenishment amount Q1 from the required toner amount Qy. More precisely, the CPU 100*a* controls the toner supply motor 374 so that the toner concentration detection value Sd of the toner concentration sensor 524 is equivalent to the reference value Sda. As a result, the development device 50 is replenished with toner in an amount corresponding to the second replenishment amount Q2. After executing step S37, the CPU 100*a* causes the processing to proceed to step S41 described later.

On the other hand, when the processing proceeds from step S33 described above to step S39, the CPU 100*a* replenishes, more precisely, controls the toner supply motor 374 to replenish the development device 50 with toner in an amount corresponding to the first replenishment amount Q1 in step S39, similarly as in step S35. Subsequently, the CPU 100*a* causes the processing to proceed to step S41. That is, when the specific time Tb has not elapsed, the CPU 100*a* executes step S39 to replenish the development device 50 with toner in an amount corresponding to the first replenishment amount Q1, but does not execute a process similar to step S37. That is, the CPU 100*a* does not replenish the development device 50 with toner in an amount corresponding to the second replenishment amount Q2, and causes the processing to proceed to step S41.

In step S41, the CPU 100*a* determines whether printing of all documents is completed. Here, when the printing of all documents is completed, the CPU 100*a* terminates the print control task. On the other hand, when printing of all documents is not yet completed, the CPU 100*a* causes the processing to proceed to step S43.

In step S43, the CPU 100*a* increments the value of the variable n expressing the order of the documents. Subsequently, the CPU 100*a* returns the processing to step S17.

Here, as described above, on the assumption that the number of printed sheets for one document is one, every time one sheet is printed, the development device 50 is replenished with toner from the toner replenishment device 37. Instead thereof, a configuration may be such that the development device 50 is replenished with toner from the toner replenishment device 37 every time a predetermined number of two or more sheets is printed.

As described above, according to the present first example, the required toner amount Qy is calculated based on image data (the printing rate Rx). The toner is replenished in an amount corresponding to the first replenishment amount Q1 included in the required toner amount Qy, and based on the toner concentration detection value Sd of the toner concentration sensor 524, the toner is replenished in an amount corresponding to the remaining second replenishment amount Q2 included in the required toner amount Qy. In other words, the first replenishment amount Q1 based on the image data and the second replenishment amount Q2 based on the toner concentration detection value Sd are set to a predetermined ratio Q1:Q2, and the development device 50 is replenished with toner of the total amount including the first replenishment amount Q1 and the second replenishment amount Q2. However, in a state in which the image forming device 10 is continuously not used for the predetermined threshold time Ts or longer, and immediately after that, during a time period until an image forming process is started and the specific time Tb elapses, the toner concentration detection value Sd is inappropriate (inaccurate). Therefore, toner of the second replenishment amount Q2 based on the inappropriate (inaccurate) toner concentration detection value Sd is not replenished. Thus, the development device 50 is always replenished with an appropriate amount of toner.

In the present first example, in particular, the CPU 100*a* executing step S19 of the print control task, that is, the CPU 100*a* calculating the required toner amount Qy, is an example of a required toner amount calculator according to the disclosure. The CPU 100*a* executing step S35 of the print control task, that is, the CPU 100*a* controlling the toner supply motor 374 so as to replenish the development device 50 with toner in an amount corresponding to the first replenishment amount Q1, is an example of a first replenishment controller according to the disclosure. The CPU 100*a* executing step S37 of the print control task, that is, the CPU 100*a* controlling the toner supply motor 374 so that the development device 50 is replenished with toner in an amount corresponding to the second replenishment amount Q2, more precisely, so that the toner concentration detection value Sd of the toner concentration sensor 524 is equivalent to the reference value Sda, is an example of a second replenishment controller according to the disclosure.

Second Example

Next, a second example of the disclosure will be described.

In the present second example, the specific time Tb is set (changed), based on (the length of) the standing time Ta. For example, when the standing time Ta is 6 hours or more and less than 12 hours, the specific time Tb is set to three minutes, and when the standing time Ta is 12 hours or more, the specific time Tb is set to six minutes. As described above, the second example is different from the first example in that the length of the specific time Tb is set according to the length of the standing time Ta. Therefore, a process of setting the specific time Tb in accordance with the standing time Ta will be described in detail here.

Figure 10:
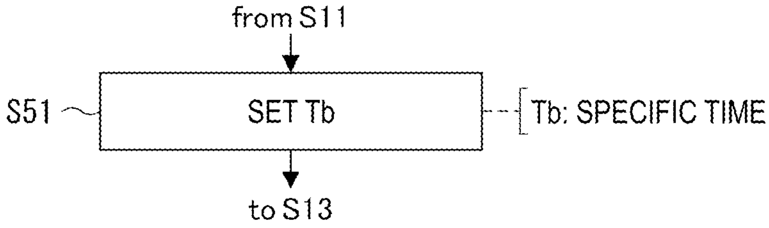
FIG. 10 is a flowchart illustrating a process flow of a part of a print control task in a second example of the disclosure.

In the present second example, step S51 illustrated in FIG. 10 is provided between step S11 and step S13 of the print control task. That is, in step S11, the CPU 100*a* confirms the standing time Ta, and then, causes the processing to proceed to step S51. Subsequently, in step S51, the CPU 100*a* sets the specific time Tb, based on the standing time Ta confirmed in step S11. Subsequently, the CPU 100a causes the processing to proceed to step S13.

The specific time Tb is set in accordance with the length of the standing time Ta in the present second example. However, as another example, the specific time may be set based on the temperature θ detected by the temperature detector 110a, instead of the standing time Ta. For example, when the temperature θ is less than 10° C., the specific time Tb may be set to two minutes. When the temperature θ is 10° C. or more and less than 50° C., the specific time Tb may be set to four minutes. When the temperature θ is 50° C. or more, the specific time Tb may be set to six minutes.

Furthermore, the specific time Tb may be set based on the humidity ρ detected by the humidity detector 110b. For example, when the humidity ρ is less than 30%, the specific time Tb may be set to two minutes. When the humidity ρ is 30% or more and less than 60%, the specific time Tb may be set to four minutes. When the humidity ρ is 60% or more, the specific time Tb may be set to six minutes.

In addition, the specific time Tb may be set based on a combination of the standing time Ta and the temperature θ, a combination of the standing time Ta and the humidity ρ, or a combination of the temperature θ and the humidity ρ. Moreover, the specific time Tb may be set based on a combination of the standing time Ta, the temperature θ, and the humidity ρ, or the specific time Tb may be set based on other parameters.

As described above, according to the present second example, the controller 100 sets the specific time Tb, based on some or all of a plurality of parameters (second parameters) including the standing time Ta, the temperature θ, and the humidity ρ. Thus, the development device 50 is replenished with a more appropriate amount of toner.

Third Example

Next, a third example of the disclosure will be described.

In the present third example, a point in time when a variation amount ΔSd of the toner concentration detection value Sd, more precisely, an absolute value |ΔSd| of the variation amount ΔSd, is equal to or less than a predetermined variation threshold value D is set as an end point of the specific time Tb. In other words, at a point in time when the absolute value |ΔSd| of the variation amount ΔSd of the toner concentration detection value Sd is equal to or less than the predetermined variation threshold value D, the toner concentration detection value Sd is assumed to be relatively stable, and the replenishment with toner in an amount corresponding to the second replenishment amount Q2, which is stopped until this point, is started. In this respect, the present third example is different from the first example and the second example described above.

The variation amount ΔSd of the toner concentration detection value Sd described here is determined by Equation 3 below and is a difference between an average value (average variation value) Sdb of the toner concentration detection values Sd of the most recent m sheets (that is, an n−(m−1)-th sheet to an n-th sheet) including the toner concentration detection value Sd when an image is formed on the n-th sheet, and the reference value Sda (for example, a digital value of 128) of the toner concentration detection value Sd. The value of m is preferably from 3 to 5, for example. The variation threshold value D is a value serving as a criterion for determining whether the toner concentration detection value Sd is relatively stable, and is a digital value of 3, for example.

$$\Delta Sd = Sdb - Sda \quad \text{Equation 3}$$

Figure 11:
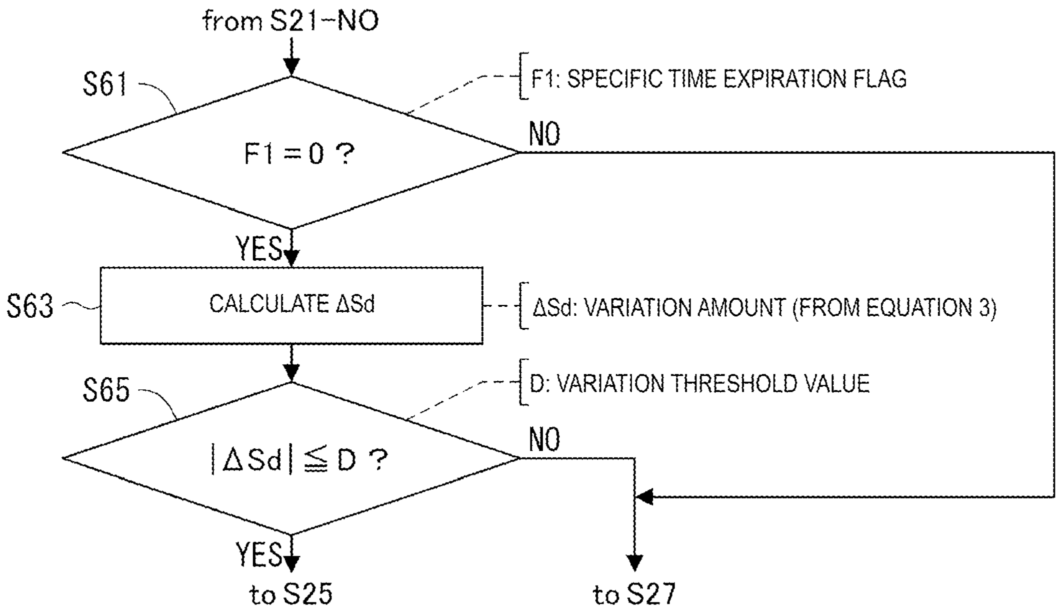
FIG. 11 is a flowchart illustrating a process flow of a part of a print control task in a third example of the disclosure.

In the present third example, step S13 in the print control task is excluded from the print control task. Furthermore, instead of step S29, steps S61 to S65 illustrated in FIG. 11 are provided.

That is, in step S21 described above, when the standing time Ta is longer than the threshold time Ts, that is, when the image forming device 10 stands unused for the threshold time Ts or longer, the CPU 100a of the controller 100 causes the processing to proceed to step S61. In step S61, the CPU 100a determines whether the specific time expiration flag F1 is 0. Here, when the specific time expiration flag F1 is 0, that is, when the specific time Tb has not elapsed, the CPU 100a causes the processing to proceed to step S63. On the other hand, when the specific time expiration flag F1 is 1, that is, when the specific time Tb has elapsed, the CPU 100a causes the processing to proceed to step S27 described above.

In step S63, the CPU 100a calculates the variation amount ΔSd of the toner concentration detection value Sd, based on Equation 3 described above. Subsequently, the CPU 100a causes the processing to proceed to step S65.

In step S65, the CPU 100a compares the absolute value |ΔSd| of the variation amount ΔSd of the toner concentration detection value Sd with the variation threshold value D. Here, when the absolute value |ΔSd| of the variation amount ΔSd is equal to or less than the variation threshold value D, that is, when the toner concentration detection value Sd can be assumed as relatively stable, the CPU 100a causes the processing to proceed to step S25 described above. On the other hand, when the absolute value |ΔSd| of the variation amount ΔSd is greater than the variation threshold value D, that is, when it is not possible to assume the toner concentration detection value Sd as relatively stable, the CPU 100a causes the processing to proceed to step S27 described above.

As described above, according to the present third example, a point in time when the toner concentration detection value Sd can be assumed to be relatively stable is set as the end point of the specific time Tb. Therefore, for example, when the toner concentration detection value Sd is relatively stable even immediately after the image forming device 10 stands unused for the threshold time Ts or more, toner in an amount corresponding to the second replenishment amount Q2 is replenished, and thus, the development device 50 is replenished with a more appropriate amount of toner.

In the present third example, when the absolute value |ΔSd| of the variation amount ΔSd of the toner concentration detection value Sd is equal to or less than the variation threshold value D, the toner concentration detection value Sd is assumed to be relatively stable. However, another method may be used to determine whether the toner concentration detection value Sd is relatively stable. For example, in Equation 3 which is a calculation equation of the variation amount ΔSd of the toner concentration detection value Sd, the current toner concentration detection value Sd may be used instead of the average value Sdb of the toner concentration detection values Sd of the most recent m sheets. That is, a difference between the current toner concentration detection value Sd and the reference value Sda (=Sd−Sda) may be used as the variation amount ΔSd of the toner concentration detection value Sd, and the absolute value |ΔSd| of the variation amount ΔSd may be compared with the variation threshold value D to determine whether the toner concentration detection value Sd is relatively stable. Alternatively, the toner concentration detection value Sd may be regarded as relatively stable, when the toner concentration detection value Sd is within a predetermined range including the reference value Sd as a middle value. Here, an appropriate predetermined range is a range of about the reference value Sd±3.

Fourth Example

Next, a fourth example of the disclosure will be described.

In the first example described above, toner of the second replenishment amount Q2 is not replenished during the specific time Tb. However, in the present fourth example, the second replenishment amount Q2 is appropriately corrected in accordance with the cumulative developing drive time Tx and the humidity ρ during the specific time Tb. More specifically, the second replenishment amount Q2 is multiplied by a second replenishment amount correction coefficient β2 to calculate a corrected second replenishment amount Q2', and toner is replenished in an amount corresponding to the corrected second replenishment amount Q2' Therefore, a second replenishment amount correction table 200 shown in FIG. 12 is provided to determine the conditions. The second replenishment amount correction table 200 is incorporated in the print control program. In addition, the corrected second replenishment amount Q2' is calculated based on Equation 4 below.

$$Q2'=Q2*\beta 2 \quad \text{Equation 4}$$

That is, in a low-humidity environment in which the relative humidity ρ is relatively low, the corrected second replenishment amount Q2' is calculated based on Equation 4 in which a value 30% is used as the second replenishment amount correction coefficient β2 during a time frame in which the cumulative developing drive time Tx is shorter than three minutes. During a time frame in which the cumulative developing drive time Tx is equal to or longer than three minutes, the corrected second replenishment amount Q2' is calculated based on Equation 4 in which a value 60% is used as the second replenishment amount correction coefficient β2. In short, in the low-humidity environment, the toner concentration detection value Sd is relatively accurate. Furthermore, when the cumulative developing drive time Tx increases, the toner concentration detection value Sd is more accurate. Accordingly, the second replenishment amount Q2 is appropriately corrected, and toner is replenished in an amount corresponding to the corrected second replenishment amount Q2'. The low-humidity environment is, for example, an environment in which the humidity ρ is less than 30%.

Furthermore, when the humidity ρ is at a standard value, the corrected second replenishment amount Q2' is calculated based on Equation 4 in which a value 20% is used as the second replenishment amount correction coefficient β2 during a time frame in which the cumulative developing drive time Tx is shorter than three minutes. During a time frame in which the cumulative developing drive time Tx is equal to or longer than three minutes, the corrected second replenishment amount Q2' is calculated based on Equation 4 in which a value 40% is used as the second replenishment amount correction coefficient β2. In short, when the humidity ρ is at a standard value, the toner concentration detection value Sd is relatively accurate, although not as accurate as in the above-described low-humidity environment. Furthermore, when the cumulative developing drive time Tx increases, the error of the toner concentration detection value Sd is more accurate. Accordingly, the second replenishment amount Q2 is appropriately corrected, and toner is replenished in an amount corresponding to the corrected second replenishment amount Q2'. The standard value of the humidity ρ is, for example, a humidity ρ of 30% or more and less than 60%.

In a high-humidity environment in which the humidity ρ is relatively high, even during a time frame in which the cumulative developing drive time Tx is shorter than three minutes and a time frame in which the cumulative developing drive time Tx is equal to or longer than three minutes, the corrected second replenishment amount Q2' is calculated based on Equation 4 in which a value 0% is used as the second replenishment amount correction coefficient ß2, that is, the corrected second replenishment amount Q2' is 0. In short, in a high-humidity environment, the toner concentration detection value Sd is inaccurate, and thus, toner is not replenished in the amount corresponding to the second replenishment amount Q2 that is based on the inaccurate toner concentration detection value Sd. The high-humidity environment is an environment in which the humidity ρ is 60% or more.

In the present fourth example, toner of an amount corresponding to the corrected second replenishment amount Q2' is replenished as described below.

That is, a reference amount of the developer stored in the development device 50 in the present fourth example is, for example, 200 g (the value varies depending on a model of the image forming device 10). The toner concentration sensor 524 has a characteristic in which the toner concentration T/D changes by 1%, when the toner concentration detection value Sd changes by 15 with respect to the developer of the reference amount of 200 g, for example. Therefore, when the toner concentration detection value Sd increases by 1, it can be estimated that the toner amount decreases by 0.13 g (=200 g*0.01/15). Thus, based on (the change of) the toner concentration detection value Sd, it is possible to determine whether toner is replenished in an amount corresponding to the second replenishment amount Q2, in other words, it is possible to determine whether toner is replenished in an amount corresponding to the corrected second replenishment amount Q2'.

Note that the second replenishment amount Q2 is an amount corresponding to 5% of the required toner amount Qy, and is 0.018 g (=0.370 g*0.05; see FIG. 5), even when the printing rate Rx is 100%. This value is less than the toner amount (0.13 g) when the above-described toner concentration detection value Sd increases by 1. Therefore, by performing the image forming process for only one sheet, it is not possible to determine, based on the toner concentration detection value Sd, whether toner is replenished in an amount corresponding to the second replenishment amount Q2. Accordingly, it is naturally not possible to determine whether toner is replenished in an amount corresponding to the corrected second replenishment amount Q2'.

Therefore, in the present fourth example, by performing the image forming process on a plurality of sheets, the toner is not replenished based on the toner concentration detection value Sd, that is, the toner is not replenished in an amount corresponding to the corrected second replenishment amount Q2', until the toner concentration detection value Sd is a value greater than the reference value Sda by a predetermined value Sx. Specifically, for example, when the predetermined value Sx is set to 10, the toner is not replenished based on the toner concentration detection value Sd, until the toner concentration detection value Sd is a value (for example, 138) greater than the reference value Sda (for example, 128) by the predetermined value Sx. For example, when the corrected second replenishment amount Q2' corresponds to 30% of the second replenishment amount Q2, the toner replenishment is started (separately from the replenishment with toner of the first replenishment amount Q1) when the toner concentration detection value Sd exceeds the reference value Sda by the predetermined value Sx. The toner replenishment is stopped when the toner concentration detection value Sd decreases by a value (that is, 3) corresponding to 30% of the predetermined value Sx (that is, when the toner concentration detection value Sd is 135). Thus, the toner is replenished in an amount corresponding to the corrected second replenishment amount Q2' corresponding to 30% of the second replenishment amount Q2. Similarly, when the corrected second replenishment amount Q2' is, for example, 60% of the second replenishment amount Q2, replenishment with toner is started (separately from the replenishment with toner of the first replenishment amount Q1) when the toner concentration detection value Sd exceeds the reference value Sda by the predetermined value Sx. The toner replenishment is stopped when the toner concentration detection value Sd decreases by a value (that is, 6) corresponding to 60% of the predetermined value Sx (that is, when the toner concentration detection value Sd is 132). Thus, the toner is replenished in an amount corresponding to the corrected second replenishment amount Q2' corresponding to 60% of the second replenishment amount Q2.

In the present fourth example, the toner is replenished in an amount corresponding to the corrected second replenishment amount Q2' as described above.

Figure 13:
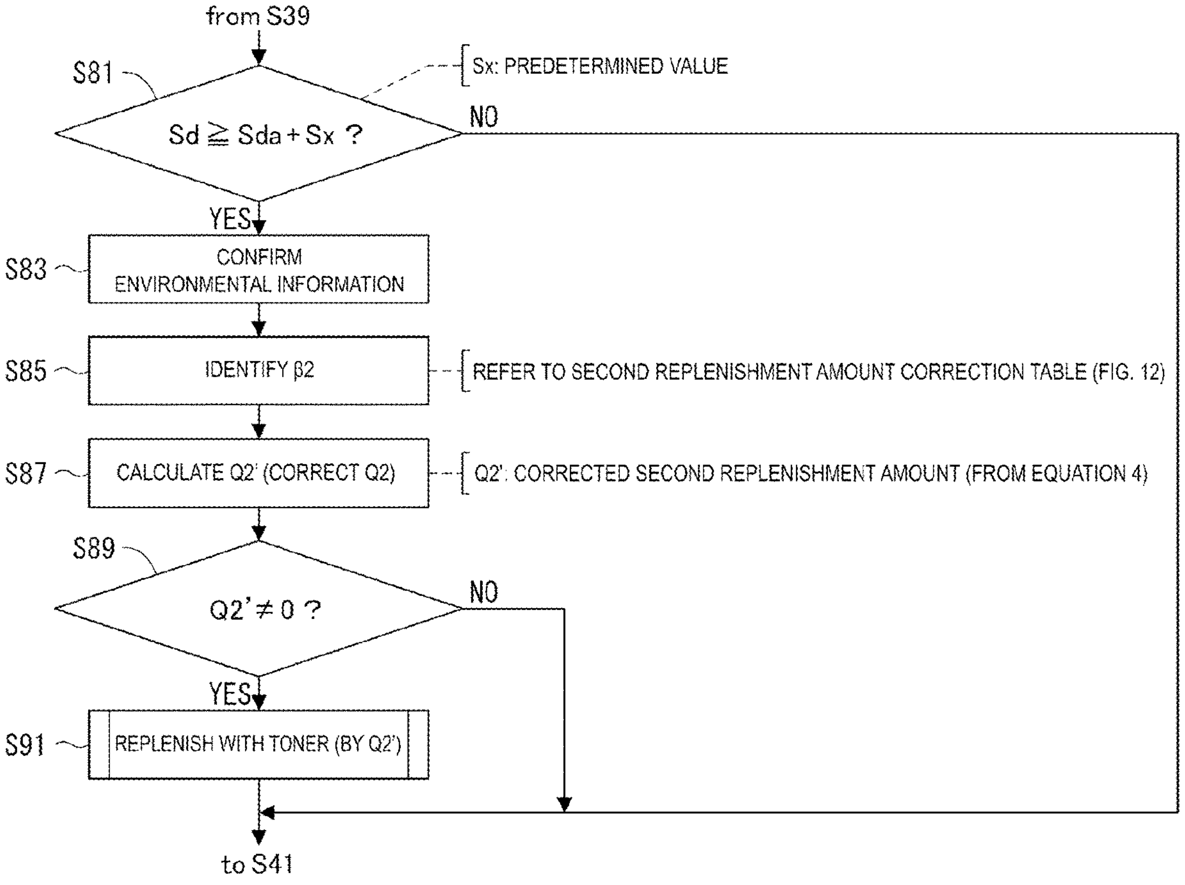
FIG. 13 is a flowchart illustrating a process flow of a part of a print control task in the fourth example.

In the present fourth example, steps S81 to S91 illustrated in FIG. 13 are provided between steps S39 and S41 of the print control task. That is, in step S39, the CPU 100*a* replenishes the development device 50 with toner of the first replenishment amount Q1, and then, causes the processing to proceed to step S81. In step S81, the CPU 100*a* compares the toner concentration detection value Sd with a value (Sda+Sx) obtained by adding the above-described predetermined value Sx to the reference value Sda. Here, when the toner concentration detection value Sd is equal to or greater than the value obtained by adding the predetermined value Sx to the reference value Sda, that is, when the toner concentration detection value Sd reaches a value greater than the reference value Sda by the predetermined value Sx, the CPU 100*a* causes the processing to proceed to step S83. On the other hand, when the toner concentration detection value Sd is less than the value obtained by adding the predetermined value Sx to the reference value Sda, that is, when the toner concentration detection value Sd does not reach a value greater than the reference value Sda by the predetermined value Sx, the CPU 100*a* causes the processing to proceed to step S41 described above.

In step S83, the CPU 100*a* confirms environmental information. Here, the CPU 100*a* confirms the humidity ρ. Subsequently, the CPU 100*a* causes the processing to proceed to step S85.

In step S85, the CPU 100*a* refers to the second replenishment amount correction table 200 described above (in FIG. 12), and identifies the second replenishment amount correction coefficient β2 in accordance with the cumulative developing drive time Tx at the current time and the humidity ρ confirmed in step S83. Subsequently, the CPU 100*a* causes the processing to proceed to step S87.

In step S87, the CPU 100*a* calculates the corrected second replenishment amount Q2', based on Equation 4 described above, that is, the CPU 100*a* corrects the second replenishment amount Q2. Subsequently, the CPU 100*a* causes the processing to proceed to step S89.

In step S89, the CPU 100*a* determines whether the corrected second replenishment amount Q2' calculated in step S87 is not 0 (zero). Here, when the corrected second replenishment amount Q2' is not 0, the CPU 100*a* causes the processing to proceed to step S91. On the other hand, when the corrected second replenishment amount Q2' is 0, the CPU 100*a* causes the processing to proceed to step S41.

In step S91, the CPU 100*a* replenishes the development device 50 with toner in an amount corresponding to the corrected second replenishment amount Q2'. The method of replenishing the toner in the amount corresponding to the corrected second replenishment amount Q2' is described above. After executing step S91, the CPU 100*a* causes the processing to proceed to step S41.

As described above, according to the present fourth example, the second replenishment amount Q2 at the specific time Tb is appropriately corrected to the corrected second replenishment amount Q2', in accordance with the cumulative developing drive time Tx and the humidity ρ. Therefore, the development device 50 is replenished with a more appropriate amount of toner at the specific time Tb.

In the present fourth example, the CPU 100*a* that executes steps S83 to S87 of the print control task is an example of a second corrector according to the disclosure.

The content of the second replenishment amount correction table 200 shown in FIG. 12 is an example, and the content is not limited thereto.

In the present fourth example, instead of the humidity ρ, or in addition to the humidity ρ, the temperature θ or another appropriate parameter may be used in a specific setting of the second replenishment amount correction coefficient β2. That is, the second replenishment amount correction coefficient β2 may be identified and thus, the corrected second replenishment amount Q2' may be calculated, based on some or all of a plurality of parameters (first parameters) including the standing time Ta, the temperature θ, and the humidity ρ.

Similarly to the second example, also in the present fourth example, the specific time Tb may be set based on some or all of a plurality of parameters including the standing time Ta, the temperature θ, and the humidity ρ. Alternatively, similarly to the third example, the point in time when the toner concentration detection value Sd can be assumed to be relatively stable may be set as the end point of the specific time Tb.

Fifth Example

Next, a fifth example of the disclosure will be described.

In the present fifth example, the first replenishment amount Q1 during the specific time Tb is appropriately corrected in accordance with the variation amount ΔSd of the toner concentration detection value Sd. That is, the first replenishment amount Q1 is corrected in accordance with the variation amount of the toner concentration detection value Sd determined by Equation 3 described above. Specifically, as indicated by Equation 5 below, a value obtained by multiplying the first replenishment amount Q1 by a first replenishment amount correction coefficient β1 is calculated as a corrected first replenishment amount Q1', and control is performed so that a toner amount of the corrected first replenishment amount Q1' is supplied to the development device 50. Here, the first replenishment amount correction coefficient β1 is a variable determined in accordance with the variation amount ΔSd of the toner concentration detection value Sd as indicated in a first replenishment amount correction table 300 shown in FIG. 14.

$$Q1' = Q1 * \beta 1 \quad \text{Equation 5}$$

Here, the first replenishment amount correction coefficient ß1 indicated in FIG. 15 will be described in detail. When the variation amount ΔSd of the toner concentration detection value Sd is negative, and in particular, as the variation amount ΔSd decreases, it is estimated that the toner is excessively included in the developer. Therefore, based on Equation 5, the first replenishment amount Q1 is appropriately corrected so that the first replenishment amount Q1 is less, that is, the first replenishment amount Q1 is multiplied by the first replenishment amount correction coefficient β1 having a value less than 100%.

On the other hand, when the variation amount ΔSd of the toner concentration detection value Sd is positive, and in particular, as the variation amount ΔSd increases, it is estimated that the amount of toner included in the developer is insufficient. Therefore, based on Equation 5, the first replenishment amount Q1 is appropriately corrected so that the first replenishment amount Q1 increases, that is, the first replenishment amount Q1 is multiplied by the first replenishment amount correction coefficient ß1 having a value greater than 100%.

When the variation amount ΔSd of the toner concentration detection value Sd is 0 or a value close to 0, for example, when the variation amount ΔSd is in a range from 0 to 3, it is estimated that the toner concentration detection value Sd is relatively stable. In this case, the first replenishment amount Q1 is multiplied by a value 100% as the first replenishment amount correction coefficient β1. That is, the corrected first replenishment amount Q1' based on Equation 5 is equivalent to the first replenishment amount Q1. In other words, the first replenishment amount Q1 is not corrected.

Figure 15:
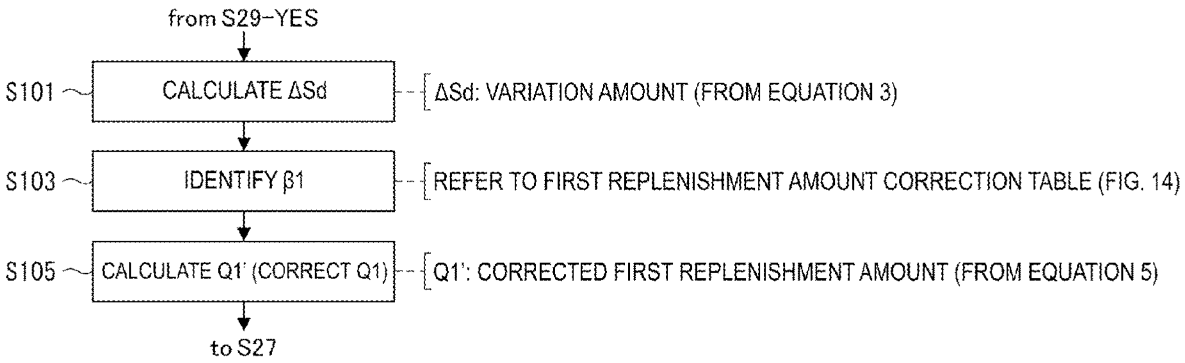
FIG. 15 is a flowchart illustrating a process flow of a part of a print control task in the fifth example.

In the present fifth example, steps S101 to S105 illustrated in FIG. 15 are provided between the YES branch in step S29 and step S27 in the print control task.

That is, when the cumulative developing drive time Tx is shorter than the specific time Tb in step S29, that is, when the specific time Tb has not elapsed yet from immediately after the image forming device 10 stands unused for the threshold time Ts or longer, the CPU 100*a* causes the processing to proceed to step S101. In step S101, the CPU 100*a* calculates the variation amount ΔSd of the toner concentration detection value Sd, based on Equation 3 described above, and then, causes the processing to proceed to step S103.

In step S103, the CPU 100*a* refers to the first replenishment amount correction table 300 to identify the first replenishment amount correction coefficient β1 in accordance with the variation amount ΔSd of the toner concentration detection value Sd calculated in step S101. Subsequently, the CPU 100*a* causes the processing to proceed to step S105.

In step S105, the CPU 100*a* calculates the corrected first replenishment amount Q1', based on Equation 5 described above, that is, the CPU 100*a* corrects the first replenishment amount Q1. Subsequently, the CPU 100*a* causes the processing to proceed to step S27.

Figure 16:
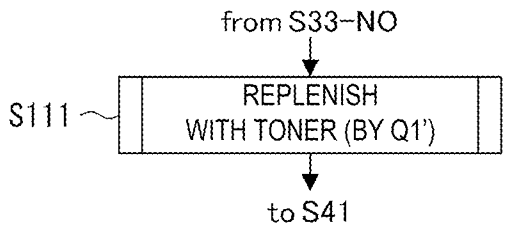
FIG. 16 is a flowchart illustrating a process flow of another part of the print control task in the fifth example.

In addition, in the present fifth example, step S111 illustrated in FIG. 16 is provided instead of step S39 of the print control task.

That is, in step S33, when the specific time expiration flag F1 is 0, that is, when the specific time Tb has not elapsed, the CPU 100*a* causes the processing to proceed to step S111. In step S111, the CPU 100*a* replenishes the development device 50 with toner in an amount corresponding to the corrected first replenishment amount Q1' calculated in step S105 described above. Subsequently, the CPU 100*a* causes the processing to proceed to step S41.

As described above, according to the present fifth example, the first replenishment amount Q1 at the specific time Tb is appropriately corrected in accordance with the variation amount ΔSd of the toner concentration detection value Sd. Thus, at the specific time Tb, the development device 50 is replenished with a more appropriate amount of toner.

In the present fifth example, the CPU 100*a* that executes steps S101 to S105 of the print control task is an example of a first corrector according to the disclosure.

Similarly to the second example, also in the present fifth example, the specific time Tb may be set based on some or all of a plurality of parameters including the standing time Ta, the temperature θ, and the humidity ρ. Alternatively, similarly to the third example, the point in time when the toner concentration detection value Sd can be assumed to be relatively stable may be set as the end point of the specific time Tb.

Sixth Example

Next, a sixth example of the disclosure will be described.

In the present sixth example, when a so-called low printing rate state in which the printing rate Rx is relatively low continues, the first replenishment amount Q1 is appropriately corrected, based on a continuous time Tz of the low printing rate state, and more specifically, the above-described first replenishment amount calculation coefficient α1 is appropriately set. For this purpose, a continuous low printing rate time table 400 shown in FIG. 17 is provided. The continuous low printing rate time table 400 is incorporated in the print control program.

That is, when the low printing rate state continues, the fluidity of the developer in the development device 50 (the first chamber 502 and the second chamber 504) decreases, and the bulk density of the carrier included in the developer decreases. As a result, the toner concentration detection value Sd decreases below the original value, and the second replenishment amount Q2 based on the toner concentration detection value Sd is not suppressed. Therefore, the actual toner concentration T/D may decrease and the density of an image formed on the sheet may decrease.

In order to avoid this inconvenience, the first replenishment amount Q1 is appropriately corrected, based on the continuous time Tz of the low printing rate state. Specifically, the first correction amount calculation coefficient α1 is set to a greater value, as the continuous time Tz of the low printing rate state is longer, and thus, the first replenishment amount Q1 is corrected to be greater. Accordingly, the second correction amount Q2 is also appropriately corrected. Specifically, the second correction amount Q2 is corrected to be less, as the continuous time Tz of the low printing rate state is longer. In other words, the ratio Q1:Q2 of the first replenishment amount Q1 to the second replenishment amount Q2 with respect to the required toner amount Qy is appropriately corrected, based on the continuous time Tz of the low printing rate state.

For example, when the continuous time Tz of the low printing rate state is less than 15 minutes, the standard value of the first correction amount calculation coefficient α1, which is 95%, is set as the first correction amount calculation coefficient α1. Thus, the first replenishment amount Q1 is a value corresponding to 95% of the required toner amount Qy, and the second replenishment amount Q2 is a value corresponding to 5% of the required toner amount Qy.

In other words, the ratio Q1:Q2 of the first replenishment amount Q1 to the second replenishment amount Q2 with respect to the required toner amount Qy is 95%:5%.

When the continuous time Tz of the low printing rate state is 15 minutes or more and less than 30 minutes, a value 96%, which is slightly greater than the standard value (95%) of the first correction amount calculation coefficient α1, is set as the first correction amount calculation coefficient α1. Thus, the first replenishment amount Q1 is a value corresponding to 96% of the required toner amount Qy, and the second replenishment amount Q2 is a value corresponding to 4% of the required toner amount Qy. In other words, the ratio Q1:Q2 of the first replenishment amount Q1 to the second replenishment amount Q2 with respect to the required toner amount Qy is 96%:4%.

When the continuous time Tz of the low printing rate state is 30 minutes or more, a value 97%, which is greater than the standard value (95%) of the first correction amount calculation coefficient α1, is set as the first correction amount calculation coefficient α1. Thus, the first replenishment amount Q1 is a value corresponding to 97% of the required toner amount Qy, and the second replenishment amount Q2 is a value corresponding to 3% of the required toner amount Qy. In other words, the ratio Q1:Q2 of the first replenishment amount Q1 to the second replenishment amount Q2 with respect to the required toner amount Qy is 97%:3%.

Note that, for example, the required toner amount Qy is compared with a predetermined replenishment amount threshold value Qs to determine whether the printing rate is low. Specifically, when the required toner amount Qy is equal to or less than the replenishment amount threshold value Qs, it is determined that the printing rate is low. When the required toner amount Qy is greater than the replenishment amount threshold value Qs, it is determined that the printing rate is not low. The replenishment amount threshold value Qs is, for example, 0.011 g. The value 0.011 g corresponds to 3% when converted into the printing rate Rx of a sheet having A4 size. The above-mentioned value of the replenishment amount threshold value Qs is an example, and the replenishment amount threshold value Qs is not limited thereto. Furthermore, the printing rate Rx and a predetermined printing rate threshold value Rs may be compared to determine whether the printing rate is low.

Figure 18:
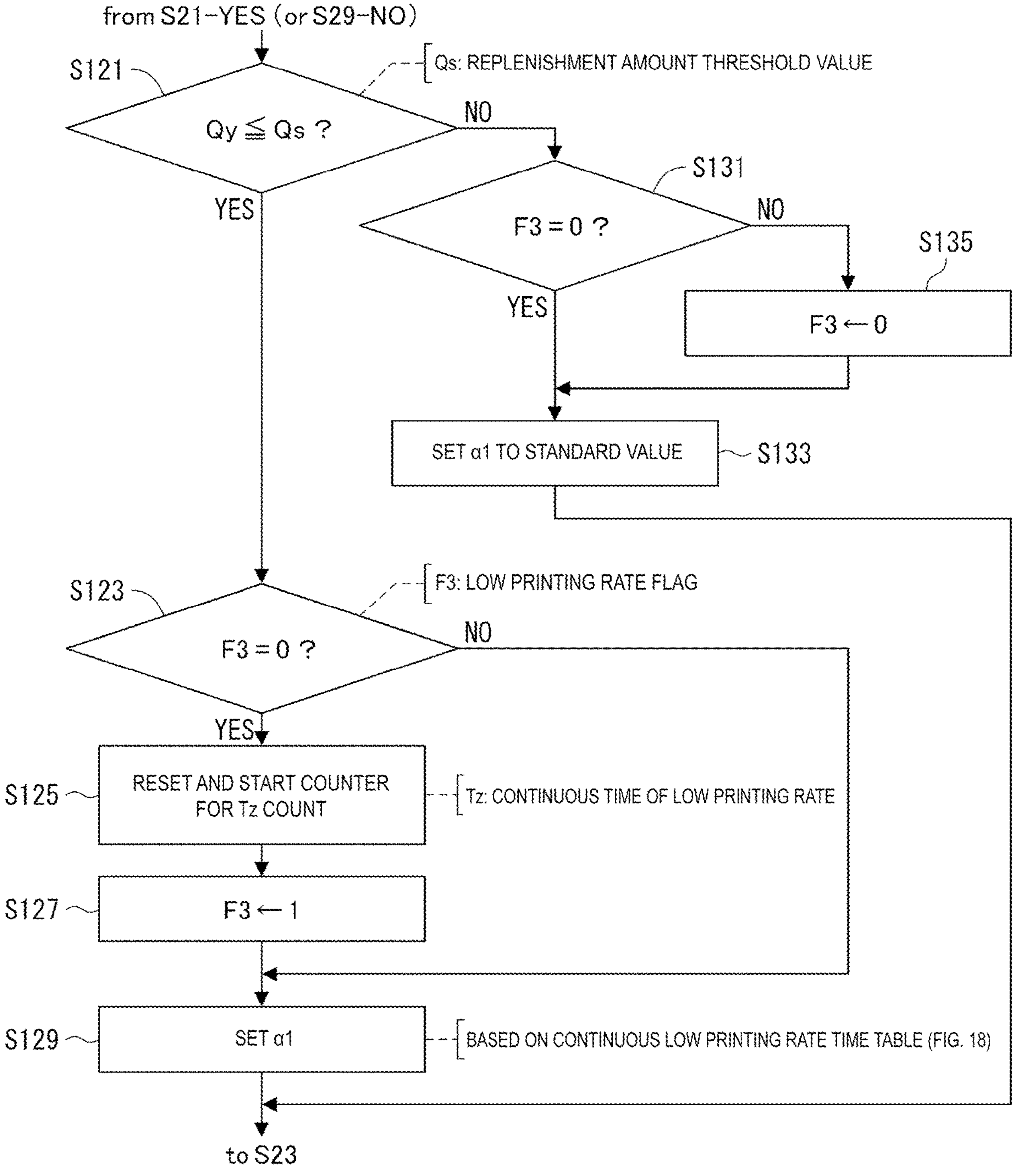
FIG. 18 is a flowchart illustrating a process flow of a part of a print control task in the sixth example.

In the present sixth example, steps S121 to S135 illustrated in FIG. 18 are provided immediately before step S23 of the print control task.

That is, in step S21 described above, when the standing time Ta is shorter than the threshold time Ts, that is, when the image forming device 10 is not standing unused for the threshold time Ts or longer, the CPU 100*a* causes the processing to proceed to step S121. Alternatively, when the cumulative developing drive time Tx is equal to or longer than the specific time Tb in step S29 described above, that is, when the specific time Tb has elapsed from immediately after the image forming device 10 stands unused for the threshold time Ts or longer, the CPU 100*a* causes the processing to proceed to step S121.

In step S121, the CPU 100*a* compares the required toner replenishment amount Qy with the predetermined replenishment amount threshold value Qs. Here, when the required toner amount Qy is equal to or less than the replenishment amount threshold value Qs, that is, when the printing rate is low, the CPU 100*a* causes the processing to proceed to step S123. On the other hand, when the required toner amount Qy is greater than the replenishment amount threshold value Qs, that is, when the printing rate is not low, the CPU 100*a* causes the processing to proceed to step S131 described later.

In step S123, the CPU 100*a* determines whether a flag F3 is 0. The flag F3 is an indicator indicating whether the printing rate is low up to this point, and is a so-called low printing rate flag. For example, when the low printing rate flag F3 is 0, the low printing rate flag F3 indicates that the printing rate up to this point is not low. When the low printing rate flag F3 is 1, the low printing rate flag F3 indicates that the printing rate up to this point is low. When the print control task is executed, the low printing rate flag F3 is set to 0 as an initial value.

In step S123, when the low printing rate flag F3 is 0, that is, when the printing rate up to this point is not low, the CPU 100*a* causes the processing to proceed to step S125. On the other hand, when the low printing rate flag F3 is 1, that is, when the printing rate up to this point is low, the CPU 100*a* causes the processing to proceed to step S129 which will be described later.

In step S125, the CPU 100*a* resets a counter (not illustrated) that counts the continuous time Tz of the low printing rate state, and causes the counter to start an operation of counting the continuous time Tz of the low printing rate state. The counter mentioned here is a software counter configured by the CPU 100*a*. However, the counter may be a hardware counter provided separately from the CPU 100*a*. Subsequently, the CPU 100*a* causes the processing to proceed to step S127.

In step S127, the CPU 100*a* sets the low printing rate flag F3 to 1. Subsequently, the CPU 100*a* causes the processing to proceed to step S129.

In step S129, the CPU 100*a* refers to the continuous low printing rate time table 400 to set (select) the first correction amount calculation coefficient α1, based on the continuous time Tz of the current low printing rate state. Subsequently, the CPU 100*a* causes the processing to proceed to step S23 described above.

On the other hand, when the processing proceeds from step S121 to step S131 described above, the CPU 100*a* determines whether the low printing rate flag F3 is 0 in step S131. Here, when the low printing rate flag F3 is 0, that is, when the printing rate up to this point is not low, the CPU 100*a* causes the processing to proceed to step S133. On the other hand, when the low printing rate flag F3 is 1, that is, when the printing rate up to this point is low, the CPU 100*a* causes the processing to proceed to step S135 which will be described later.

In step S133, the CPU 100*a* sets the first correction amount calculation coefficient α1 to a value 95% as a standard value. Subsequently, the CPU 100*a* causes the processing to proceed to step S23 described above.

On the other hand, when the processing proceeds from step S131 to step S135, the CPU 100*a* sets the low printing rate flag F3 to 0 in step S135. Subsequently, the CPU 100*a* causes the processing to proceed to step S133.

As described above, according to the present sixth example, when the low printing rate state continues, the first replenishment amount Q1 is appropriately corrected, based on the continuous time Tz of the low printing rate state, and accordingly, the second correction amount Q2 is also appropriately corrected. Therefore, even when the low printing rate state continues, the development device 50 is always replenished with an appropriate amount of toner.

In the present sixth example, the CPU 100*a* that executes step S129 of the print control task is an example of a third corrector according to the disclosure.

Similarly to the second example, also in the present sixth example, the specific time Tb may be set based on some or all of a plurality of parameters including the standing time Ta, the temperature θ, and the humidity ρ. Alternatively, similarly to the third example, the point in time when the toner concentration detection value Sd can be assumed to be relatively stable may be set as the end point of the specific time Tb. Similarly to the fourth example, the second replenishment amount Q2 at the specific time Tb may be appropriately corrected in accordance with the cumulative developing drive time Tx and the humidity ρ. In addition, similarly to the fifth example, the first replenishment amount Q1 at the specific time Tb may be appropriately corrected in accordance with the variation amount ΔSd of the toner concentration detection value Sd.

Seventh Example

Next, a seventh example of the disclosure will be described.

The present seventh example assumes a case where the above-described process control is not provided. In this case, an error included in the required toner amount Qy is greater than in the case where the process control is provided, and the error is estimated to be, for example, about +20%. Therefore, in the present seventh example, the standard value of the first replenishment amount calculation coefficient $\alpha\mathbf{1}$ is 80%. As a result, the first replenishment amount Q1 is a value corresponding to 80% of the required toner amount Qy, and the second replenishment amount Q2 is a value corresponding to 20% of the required toner amount Qy. Thus, even in the case where the process control is not provided, the development device 50 is always replenished with an appropriate amount of toner.

That is, according to the seventh example, it is possible to appropriately handle a case where the process control is not provided.

Similarly to the second example, also in the present seventh example, the specific time Tb may be set based on some or all of a plurality of parameters including the standing time Ta, the temperature θ, and the humidity ρ. Alternatively, similarly to the third example, the point in time when the toner concentration detection value Sd can be assumed to be relatively stable may be set as the end point of the specific time Tb. Similarly to the fourth example, the second replenishment amount Q2 at the specific time Tb may be appropriately corrected in accordance with the cumulative developing drive time Tx and the humidity ρ. In addition, similarly to the fifth example, the first replenishment amount Q1 at the specific time Tb may be appropriately controlled in accordance with the variation amount ΔSd of the toner concentration detection value Sd.

Also in the present seventh example, similarly to the sixth example, when the low printing rate state continues, the first replenishment amount Q1 may be appropriately corrected, based on the continuous time Tz of the low printing rate state. However, in this case, the continuous low printing rate time table 400 shown in FIG. 19 is used.

Other Application Examples

The above-described examples are specific examples of the disclosure, and do not limit the technical scope of the disclosure. The disclosure can be applied to aspects other than these examples.

For example, in each example, a configuration in which the development device 50 is replenished with toner from the toner replenishment device 37 has been described as an example. However, the disclosure is not limited thereto, and may be applied to a configuration in which a developer including a toner and a carrier is supplied to the development device 50.

In the examples, the image forming device 10 employing the color image former 26 of a tandem type has been described as an example. However, the disclosure can also be applied to an image forming device employing a color image former of a rotary type. Furthermore, the disclosure can also be applied to a monochrome image forming device.

In addition, the image forming device 10 in each example is a multifunction peripheral. However, the disclosure can also be applied to an image forming device other than the multifunction peripheral, such as a dedicated printing machine, a dedicated copy machine, or a dedicated fax machine.

The disclosure can be provided not only in the form of a device called an image forming device, but also in the form of a method called a toner replenishment control method in an image forming device.

REFERENCE SIGNS LIST

10 Image forming device
26 Image former
37 Toner replenishment device
46 Photoreceptor drum
50 Development device
63 Toner cartridge
100 Controller
100*a* CPU
100*b* Main storage
110 Environment monitoring portion
110*a* Temperature detector
110*b* Humidity detector
372 Supply screw
374 Toner supply motor
502 First chamber
504 Second chamber
524 Toner concentration sensor
Q1 First replenishment amount
Q2 Second replenishment amount
Qz Appropriate replenishment amount

The invention claimed is:

1. An image forming device comprising:
- a developing device that includes a storage in which a developer including a toner is stored and that uses the toner to perform a development of a latent image formed, based on image data, on an image carrier;
- a toner concentration detector that detects a concentration of the toner included in the developer in the storage;
- a toner replenisher that includes a toner container storing the toner and that replenishes the storage with the toner in the toner container;
- a required toner amount calculator that calculates, based on the image data, a required toner amount, the required toner amount being an amount of the toner required in the development;
- a first replenishment controller that controls the toner replenisher to replenish the storage with the toner in an amount corresponding to a first replenishment amount of the required toner amount; and
- a second replenishment controller that controls the toner replenisher to replenish the storage, based on a toner concentration detection value of the toner concentration detector, with the toner in an amount corresponding to a second replenishment amount obtained by subtracting the first replenishment amount from the required toner amount, wherein the second replenishment controller does not replenish the storage by the toner replenisher with the toner in the amount corresponding to the second replenishment amount, during a time period from when the development starts until a predetermined specific time elapses, in a case that a standing time, which is a time during which the image forming device continuously stands unused, is equal to or longer than a predetermined threshold time.

2. The image forming device according to claim 1, wherein the first replenishment amount is greater than the second replenishment amount.

3. The image forming device according to claim 1, further comprising:

a first corrector that corrects the first replenishment amount at the predetermined specific time based on a variation amount of the toner concentration detection value.

4. The image forming device according to claim 1, wherein the predetermined specific time is set in accordance with some or all of a plurality of first parameters including the standing time and a predetermined environmental factor.

5. The image forming device according to claim 1, wherein a time point, at which a variation amount of the toner concentration detection value is equal to or less than a predetermined variation threshold value, is set as an end point of the predetermined specific time.

6. The image forming device according to claim 1, further comprising:

a second corrector that, when a low printing rate state continues, corrects the first replenishment amount based on a continuous time of the low printing rate state.

7. The image forming device according to claim 1, wherein the first replenishment amount is set to a value in accordance with whether an automatic density adjustment function is provided, the automatic density adjustment function adjusting a driving parameter of a predetermined image forming element including the developing device in such a manner that a toner consumption amount is constant with respect to the image data that is constant.

8. A toner replenishment control method used in an image forming device, the image forming device including:

a developing device that includes a storage in which a developer including a toner is stored and that uses the toner to perform a development of a latent image formed, based on image data, on an image carrier;

a toner concentration detector that detects a concentration of the toner included in the developer in the storage; and a toner replenisher that includes a toner container storing the toner and that replenishes the storage with the toner in the toner container, the toner replenishment control method comprising:

calculating, based on the image data, a required toner amount, the required toner amount being an amount of the toner required in the development;

controlling the toner replenisher to replenish the storage with the toner in an amount corresponding to a first replenishment amount that is a part of the required toner amount; and controlling, after controlling the toner replenisher to replenish the storage with the toner in the first replenishment amount, the toner replenisher to replenish the storage, so that a toner concentration detection value of the toner concentration detector becomes equal to a predetermined reference value, with the toner in an amount corresponding to a second replenishment amount obtained by subtracting the first replenishment amount from the required toner amount.

9. An image forming device comprising:

a developing device that includes a storage in which a developer including a toner is stored and that uses the toner to perform a development of a latent image formed, based on image data, on an image carrier;

a toner concentration detector that detects a concentration of the toner included in the developer in the storage;

a toner replenisher that includes a toner container storing the toner and that replenishes the storage with the toner in the toner container;

a required toner amount calculator that calculates, based on the image data, a required toner amount, the required toner amount being an amount of the toner required in the development;

a first replenishment controller that controls the toner replenisher to replenish the storage with the toner in an amount corresponding to a first replenishment amount that is a part of the required toner amount; and a second replenishment controller that control, after controlling the toner replenisher to replenish the storage with the toner in the first replenishment amount, the toner replenisher to replenish the storage, so that a toner concentration detection value of the toner concentration detector becomes equal to a predetermined reference value, with the toner in an amount corresponding to a second replenishment amount obtained by subtracting the first replenishment amount from the required toner amount.

10. The image forming device according to claim 9, wherein the first replenishment amount is greater than the second replenishment amount.

11. The image forming device according to claim 9, wherein the second replenishment controller does not replenish the storage by the toner replenisher with the toner in the amount corresponding to the second replenishment amount, during a time period from when the development starts until a predetermined specific time elapses, in a case that a standing time, which is a time during which the image forming device continuously stands unused, is equal to or longer than a predetermined threshold time.

12. The image forming device according to claim 11, further comprising a first corrector that corrects the first replenishment amount at the predetermined specific time based on a variation amount of the toner concentration detection value.

13. The image forming device according to claim 11, wherein the predetermined specific time is set in accordance with some or all of a plurality of second parameters including the standing time and a predetermined environmental factor.

14. The image forming device according to claim 11, wherein a time point, at which a variation amount of the toner concentration detection value is equal to or less than a predetermined variation threshold value, is set as an end point of the predetermined specific time.

15. The image forming device according to claim 9, further comprising a second corrector that corrects the second replenishment amount, based on some or all of a plurality of first parameters including a predetermined environmental factor and an elapsed time having a time point at which the development is started as a starting point, during a time period from when the development starts until a predetermined specific time elapses, and when a standing time being a time which the image forming device continuously stands unused is equal to or longer than a predetermined threshold time.

16. The image forming device according to claim 9, further comprising a third corrector that, when a low printing rate state continues, corrects the first replenishment amount based on a continuous time of the low printing rate state.

17. The image forming device according to claim 9, wherein the first replenishment amount is set to a value in accordance with whether an automatic density adjustment function is provided, the automatic density adjustment function adjusting a driving parameter of a predetermined image forming element including the developing device in such a manner that a toner consumption amount is constant with respect to the image data that is constant.

* * * * *